United States Patent
Yamasaki

(10) Patent No.: US 11,023,188 B2
(45) Date of Patent: Jun. 1, 2021

(54) INFORMATION PROCESSING APPARATUS AND NON-TRANSITORY COMPUTER READABLE MEDIUM FOR PRESENTING A SCHEDULE OF PLURAL PRINT JOBS

(71) Applicant: FUJI XEROX CO., LTD., Tokyo (JP)

(72) Inventor: Naoto Yamasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 60 days.

(21) Appl. No.: 16/108,149

(22) Filed: Aug. 22, 2018

(65) Prior Publication Data

US 2019/0073164 A1 Mar. 7, 2019

(30) Foreign Application Priority Data

Sep. 5, 2017 (JP) .............................. JP2017-170468

(51) Int. Cl.
*G06F 3/12* (2006.01)

(52) U.S. Cl.
CPC ............ *G06F 3/126* (2013.01); *G06F 3/1205* (2013.01); *G06F 3/1211* (2013.01); *G06F 3/1234* (2013.01); *G06F 3/1256* (2013.01); *G06F 3/1273* (2013.01); *G06F 3/1285* (2013.01)

(58) Field of Classification Search
CPC ...... G06F 3/126; G06F 3/1205; G06F 3/1211; G06F 3/1234; G06F 3/1256; G06F 3/1273; G06F 3/1285

USPC .................................................. 358/1.1–1.18
See application file for complete search history.

(56) References Cited

U.S. PATENT DOCUMENTS

| | | | |
|---|---|---|---|
| 8,270,007 B2 | 9/2012 | Pandit et al. | |
| 9,723,162 B2 | 8/2017 | Abe | |
| 2004/0190057 A1* | 9/2004 | Takahashi | G06F 3/1275 358/1.15 |
| 2010/0053690 A1* | 3/2010 | Gotoh | H04N 1/6011 358/3.27 |
| 2010/0073712 A1 | 3/2010 | Cain | |
| 2011/0007338 A1* | 1/2011 | Kawanishi | G06F 3/1286 358/1.14 |
| 2012/0212770 A1* | 8/2012 | Gaertner | G06F 3/1285 358/1.15 |
| 2017/0160993 A1 | 6/2017 | Abe | |
| 2017/0289370 A1 | 10/2017 | Abe | |

FOREIGN PATENT DOCUMENTS

| | | |
|---|---|---|
| JP | 2009-193572 A | 8/2009 |
| JP | 2010-079895 A | 4/2010 |
| JP | 2015-074205 A | 4/2015 |

* cited by examiner

*Primary Examiner* — Gabriel I Garcia
(74) *Attorney, Agent, or Firm* — Oliff PLC

(57) ABSTRACT

An information processing apparatus includes a generator and a presenter. The generator generates a schedule of plural print jobs to be processed in a subject printer device. Concerning a print job in which an error or a user intervention will occur, the presenter presents the print job in a different mode from another print job by using the schedule.

12 Claims, 23 Drawing Sheets

FIG. 5

| 505 | 510 | 515 | 520 | 525 | 530 | 535 | 540 | 545 | 550 |
|---|---|---|---|---|---|---|---|---|---|
| PRINT JOB ID | PRINT JOB NAME | OWNER | NUMBER OF PAGES | NUMBER OF COPIES | SHEET SIZE | PRINT DOCUMENT | COLOR/ MONOCHROME | PRINTED-MATERIAL OUTPUT LOCATION NO. | POST-PROCESSING |
| 1 | PAMPHLET AA-1 | USER A | 16 | 50 | A4 | DOCUMENT ID | COLOR | | |

| 605 | 610 | 615 | 622 | 624 | 626 | 632 | 634 | 640 | 645 | 650 |
|---|---|---|---|---|---|---|---|---|---|---|
| | | | | REMAINING TONER (620) | | | REMAINING SHEETS (630) | | | |
| PRINTER DEVICE ID | PRINTER DEVICE NAME | PRINT SPEED | A TONER | B TONER | C TONER ... | A4 | A3 ... | NUMBER OF PRINTED MATERIAL OUTPUT LOCATIONS | POST-PROCESSING FUNCTION | PRINT COST |
| | | | | | | | | | | |

600

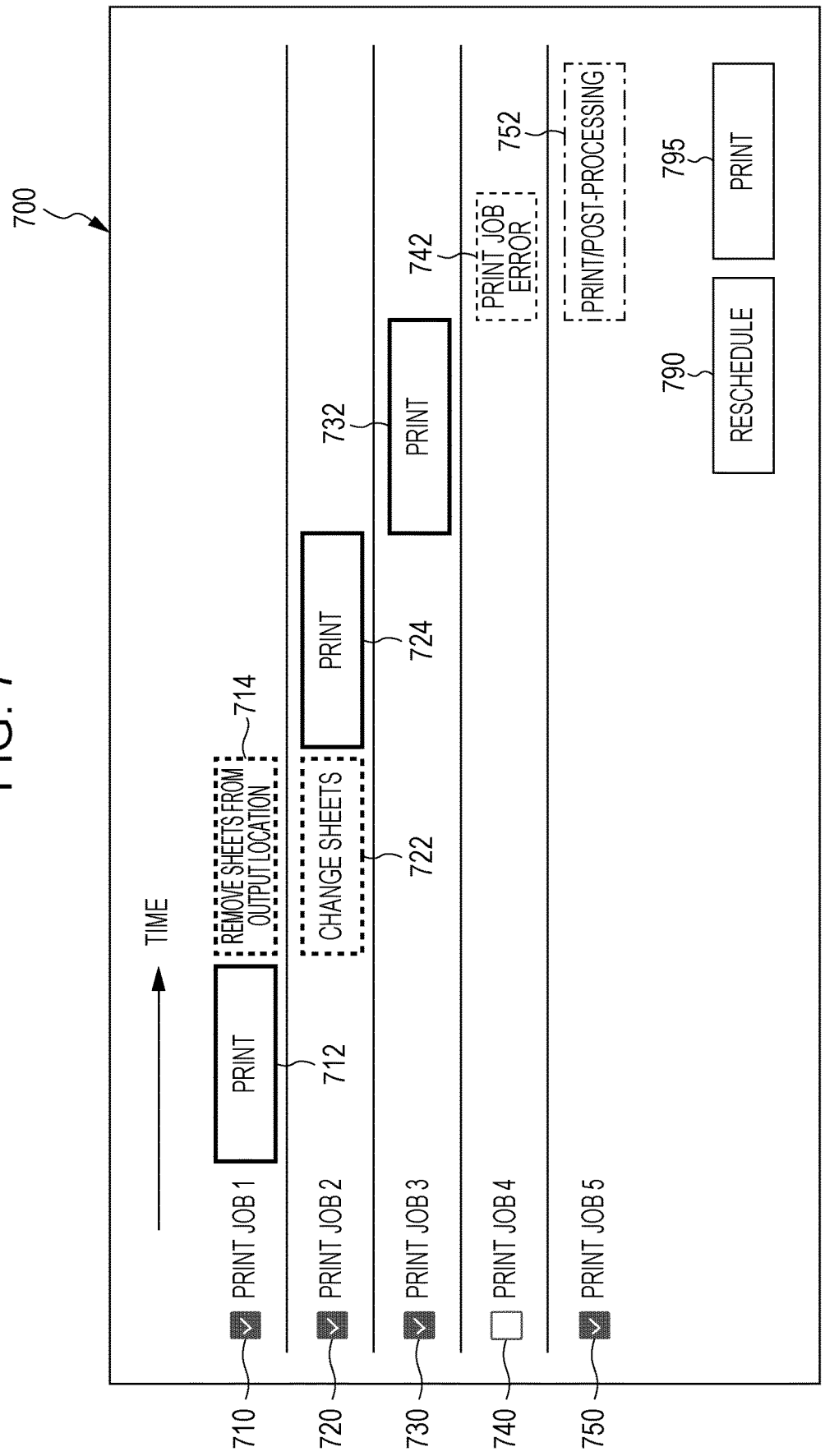

FIG. 18

| 1805 | 1810 | 1815 | 1820 | 1825 | 1830 | 1835 |
|---|---|---|---|---|---|---|
| DOCUMENT ID | DOCUMENT NAME | DOCUMENT MODE | NUMBER OF PAGES | COLOR/ MONOCHROME | FONT | IMAGE GENERATING PROGRAM |
|  |  |  |  |  |  |  |

| 1905 | 1910 | 1915 | 1920 | 1925 |
|---|---|---|---|---|
| EXTERNAL CONTROLLER | IMAGE GENERATING PROGRAM | FONT | PROCESSING SPEED | PROCESSING COST |
|  |  |  |  |  |

1900

INFORMATION PROCESSING APPARATUS AND NON-TRANSITORY COMPUTER READABLE MEDIUM FOR PRESENTING A SCHEDULE OF PLURAL PRINT JOBS

CROSS-REFERENCE TO RELATED APPLICATIONS

This application is based on and claims priority under 35 USC 119 from Japanese Patent Application No. 2017-170468 filed Sep. 5, 2017.

BACKGROUND

Technical Field

The present invention relates to an information processing apparatus and a non-transitory computer readable medium.

SUMMARY

According to an aspect of the invention, there is provided an information processing apparatus including a generator and a presenter. The generator generates a schedule of plural print jobs to be processed in a subject printer device. Concerning a print job in which an error or a user intervention will occur, the presenter presents the print job in a different mode from another print job by using the schedule.

BRIEF DESCRIPTION OF THE DRAWINGS

Exemplary embodiments of the present invention will be described in detail based on the following figures, wherein:

FIG. 5 illustrates an example of the data structure of a print job information table;

FIG. 6 illustrates an example of the data structure of a printer device function table;

FIG. 7 illustrates a presentation example according to the first exemplary embodiment;

FIG. 18 illustrates an example of the data structure of a document data table;

FIG. 19 illustrates an example of the data structure of an image processing performance table;

DETAILED DESCRIPTION

Exemplary embodiments of the invention will be described below with reference to the accompanying drawings.

First Exemplary Embodiment

Figure 1:
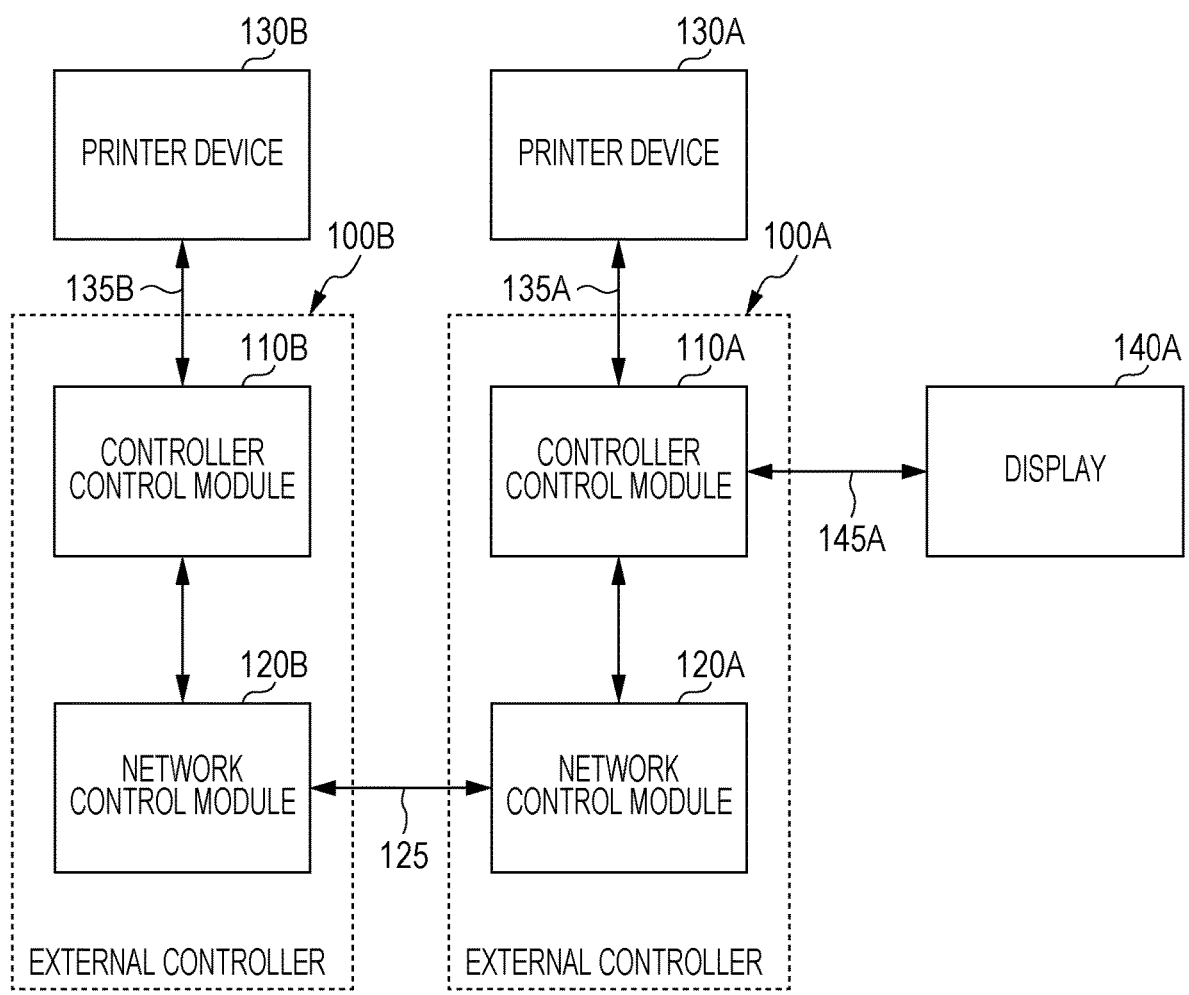
FIG. 1 is a block diagram of conceptual modules forming an example of the configuration of the exemplary embodiments.

FIG. 1 is a block diagram of conceptual modules forming an example of the configuration of the exemplary embodiments (first and second exemplary embodiments).

Generally, modules are software (computer programs) components or hardware components that can be logically separated from one another. The modules of the exemplary embodiments of the invention are, not only modules of a computer program, but also modules of a hardware configuration. Thus, the exemplary embodiments will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiments relate to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiments, and also includes the meaning of being determined prior to a certain operation even after starting processing of the exemplary embodiments, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk, a random access memory (RAM), an external storage medium, a storage device using a communication line, and a register within a central processing unit (CPU).

An external controller 100 according to the exemplary embodiments processes plural print jobs. As shown in FIG. 1, the external controller 100 includes a controller control module 110 and a network control module 120.

Basically, the configurations of external controllers 100A and 100B are the same. As viewed from the external controller 100A, the external controller 100B (may include a printer device 130B) is another printer device. Thus, a display 140B (not shown) may be connected to a controller control module 110B of the external controller 100B via a display cable 145B (not shown). The performance of the external controller 100A (including a printer device 130A) and that of the external controller 100B (including the printer device 130B) may be different from each other. Examples of the performance are print speed, types of print sheets that can be used, and types of fonts that can be printed. One printer device may be more efficient than another printer device depending on the print job.

In the example shown in FIG. 1, a management server that manages printer devices 130 is not provided. Instead, the external controllers 100 operate in cooperation with each other via a communication line 125. However, a management server which manages plural printer devices 130 may be provided. In this case, the management server includes controller control modules 110.

The external controller 100A includes a controller control module 110A and a network control module 120A. The external controller 100A causes the printer device 130A to perform printing in accordance with a print job. The external controller 100A presents a schedule of plural print jobs on a display 140A. The schedule indicates at least the order of processing of print jobs. The schedule may also indicate a processing time (processing start time (year, month, day, hour, minute, second, millisecond, or a combination thereof), processing end time, a time taken to execute processing). The schedule may also indicate information that an error or a user intervention will occur and concerning a time taken to perform a user intervention if a user intervention occurs. This will be discussed in detail later.

The controller control module 110A is connected to the network control module 120A and is also connected to the printer device 130A via a dedicated line 135A and to the display 140A via a display cable 145A. The controller control module 110A generates a schedule of print jobs and presents the schedule on the display 140A. The controller control module 110A may present the schedule by displaying it on a display, such as a liquid crystal display. The controller control module 110A may also output vibration or sound from a sound output device, such as a speaker, to present the schedule.

When a print instruction to perform printing in accordance with the schedule is provided by user operation, the external controller 100A causes the printer device 130A to perform printing in accordance with the schedule.

The network control module 120A is connected to the controller control module 110A, and is also connected to a network control module 120B of the external controller 100B via the communication line 125. The network control module 120A communicates with the external controller 100B, which is another printer device. For example, if it is likely that a certain print job will be processed more efficiently by the external controller 100B, the external controller 100A may send such a print job to the external controller 100B. Conversely, the external controller 100A may receive a print job from the external controller 100B.

The printer device 130A is connected to the controller control module 110A of the external controller 100A via the dedicated line 135A. The printer device 130A performs printing under the control of the controller control module 110A. The printer device 130A may be a production printer. That is, a print job is processed by a production printer to perform printing.

The production printer is a printer device which produces various commercial printed materials and is used in the light printing industry market. In the production printer, received print jobs are continuously executed, that is, a large number of print jobs, and, moreover, print jobs that take a relatively long time to process, are executed. It is thus necessary to check the schedule of print jobs in advance (before printing). That is, to achieve high efficiency, the effective use of the production printer is required.

On the other hand, however, printing is performed under the various conditions (such as the sheet type and the sheet size) in response to a demand of an end user. User (operator) interventions thus occur, such as changing of print sheets at a timing of switching print jobs.

User interventions increase downtime in the printer device 130A, and the efficiency is decreased.

In the exemplary embodiments, print jobs are executed in order in which downtime of a printer device can be decreased, and also, a print job that is not possible to execute in a certain printer device 130 is transferred to another printer device 130 (another external controller 100).

The display 140A is connected to the controller control module 110A of the external controller 100A via the display cable 145A. The display 140A displays a schedule generated by the controller control module 110A. As described above, another element, such as a speaker, may be added to the external controller 100A.

Figure 2:
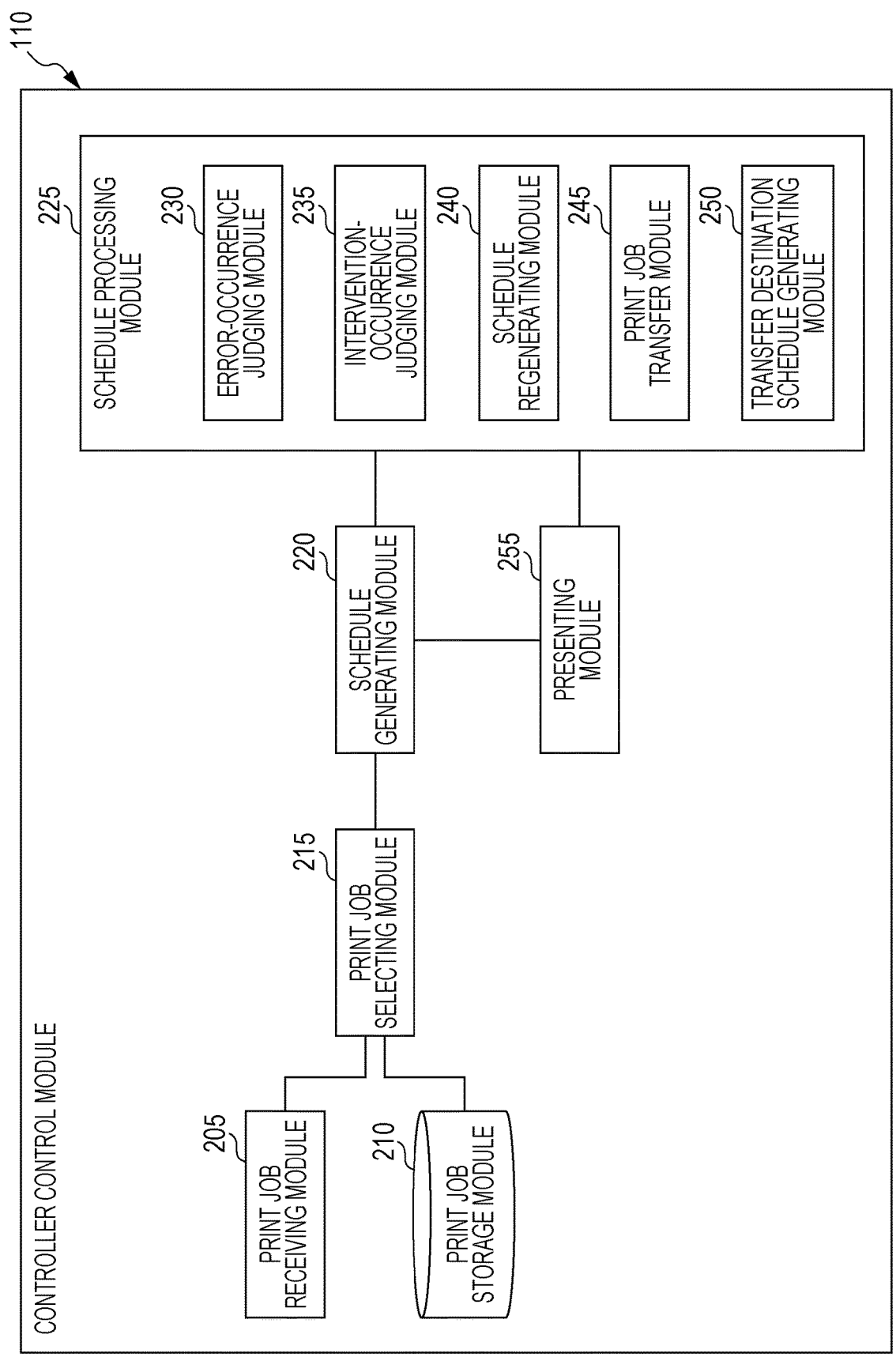
FIG. 2 is a block diagram of conceptual modules forming an example of the configuration of a first exemplary embodiment.

FIG. 2 is a block diagram of conceptual modules forming an example of the configuration of a first exemplary embodiment.

The controller control module 110 includes a print job receiving module 205, a print job storage module 210, a print job selecting module 215, a schedule generating module 220, a schedule processing module 225, and a presenting module 255.

The print job receiving module 205 is connected to the print job selecting module 215. The print job receiving module 205 receives a print job sent from a user terminal 310, which will be discussed later, or another printer device 130, and transfers the received print job to the print job selecting module 215. "Another printer device 130" includes another external controller 100.

The print job storage module 210 is connected to the print job selecting module 215. The print job storage module 210 stores print jobs that have not yet been subjected to print processing (print jobs received by the print job receiving module 205 or print jobs for which scheduling has not been made).

The print job selecting module 215 is connected to the print job receiving module 205, the print job storage module 210, and the schedule generating module 220. The print job selecting module 215 selects a print job received from the print job receiving module 205 or a print job stored in the print job storage module 210. Scheduling will be made to the selected print job so that print processing for this print job can be performed by the printer device 130 connected to the controller control module 110. The print job selecting module 215 selects a print job in accordance with user operation or a predetermined rule. One example of the predetermined rule is that a print job for which a print due-date is approaching is preferentially selected.

The schedule generating module 220 is connected to the print job selecting module 215, the schedule processing module 225, and the presenting module 255. The schedule generating module 220 generates a schedule of plural print jobs to be processed in the printer device 130. That is, the schedule generating module 220 determines the order in which print jobs will be processed. The schedule generating module 220 may generate a schedule by rearranging print jobs in chronological order in which the print jobs are selected by the print job selecting module 215 or in which the print jobs are received by the print job receiving module 205, or in order in which the print due-date is approaching sooner.

The schedule processing module 225 includes an error-occurrence judging module 230, an intervention-occurrence judging module 235, a schedule regenerating module 240, a print job transfer module 245, and a transfer destination schedule generating module 250. The schedule processing module 225 is connected to the schedule generating module 220 and the presenting module 255. The schedule processing module 225 executes processing concerning a schedule generated by the schedule generating module 220.

The error-occurrence judging module 230 judges (predicts), for each of print jobs for which scheduling has been made by the schedule generating module 220, whether an error will occur when a corresponding print job is executed by the printer device 130 connected to the controller control module 110. For example, if a print job indicates that a print document will be printed by using a function which is not provided in the printer device 130 or by using a font which is not supported by the printer device 130, the error-occurrence judging module 230 judges that an error will occur. For example, if a print job indicates that a print document will be printed by using a post-processing function such as a stapling function, which is not provided in the printer device 130, the error-occurrence judging module 230 judges that an error will occur.

The intervention-occurrence judging module 235 judges (predicts), for each of print jobs for which scheduling has been made by the schedule generating module 220, whether a user intervention will occur when a corresponding print job is executed by the printer device 130 connected to the controller control module 110. For example, the intervention-occurrence judging module 235 makes this judgement, based on the relationship between a subject print job and the previous print job. Three specific cases in which a user intervention will occur will be discussed below.

(1) If the printed-material output location, such as a sheet discharge tray, to be used in a subject print job is the same as that in the previous print job, the subject print job is not possible to start until a printed material concerning the previous print job is removed. Thus, a user intervention, that is, removing of a printed material will occur.

(2) If most of sheets stored in the printer device 130 are used by the previous print job, the printer device 130 may be out of sheets while a subject print job is being executed. Thus, a user intervention, that is, reloading of sheets will occur.

(3) If most of toner stored in the printer device 130 is used by the previous print job, toner may become low while a subject print job is being executed. Thus, a user intervention, that is, refilling of toner will occur.

The schedule regenerating module 240 regenerates a schedule of plural print jobs including a print job in which an error or a user intervention will occur so that no user intervention will occur or the time for which the printer device 130 is unavailable will be decreased.

"The time for which the printer device 130 is unavailable" is usually called "downtime". Downtime is a time from when the printer device 130 becomes unavailable until when the printer device 130 becomes available again by performing a certain user intervention, such as reloading of sheets if sheets become short or refilling toner if toner becomes low.

The schedule regenerating module 240 may regenerate a schedule so that a function to be used in a first print job will be different from that in a second print job, which is executed subsequent to the first print job.

The schedule regenerating module 240 may regenerate a schedule by using at least one of the following rules.

(1) The printed-material output location to be used in a first print job is different from that in a second print job.

After a first print job using a certain printed-material output location has been executed, a second print job using another printed-material output location is executed. With this arrangement, the second print job can start immediately without waiting for removing of a printed material from the printed-material output location used in the first print job, thereby decreasing the downtime.

(2) A sheet feeder to be used in a first print job is different from that in a second print job.

After a first print job for printing on A4 sheets, for example, a second print job for printing on A3 sheets, for example, is executed. If, after the first print job, a print job for printing on A4 sheets is executed, A4 sheets are likely to be short. However, the second print job for printing on A3 sheets follows the first print job. This makes it less likely that a user intervention, that is, reloading of sheets will occur.

While the second print job is being executed, an instruction to reload A4 sheets may be presented.

(3) A toner type to be used in a first print job is different from that in a second print job.

After a first print job using color toner, for example, a second print job for performing monochrome printing is executed. If, after the first print job, a print job for using color toner is executed, color toner is likely to become low. However, the second print job for performing monochrome printing follows the first print job. This makes it less likely that a user intervention, that is, refilling of color toner will occur. While the second print job is being executed, an instruction to refill color toner may be presented.

Upon receiving a first instruction concerning a certain print job, the print job transfer module 245 transfers this print job to another printer device 130.

Upon receiving the first instruction or a second instruction concerning a certain print job, the transfer destination schedule generating module 250 generates a schedule to be used in another printer device 130 before the print job is transferred to this printer device 130. That is, the transfer destination schedule generating module 250 requests this printer device 130 to send the schedule used in this printer device 130.

The presenting module 255 is connected to the schedule generating module 220 and the schedule processing module 225. Concerning a print job in which an error or a user intervention will occur, the presenting module 255 presents such a print job in a different mode from another print job by using the schedule generated by the schedule generating module 220.

In this case, "another print job" is a print job that is likely to be successfully completed without any user intervention.

"Presenting in a different mode" refers to that a graphical symbol representing a print job (also called an icon) is presented in a different manner or that a graphical symbol (including an icon representing only characters) is added to such a print job.

The presenting module 255 may provide a first presentation that makes it possible to receive a first instruction to transfer a print job in which an error or a user intervention will occur to a different printer device 130.

The presenting module 255 may provide a different presentation that makes it possible to receive a second instruction to transfer a print job which may be executed more efficiently by using a different printer device 130 than by using the printer device 130A (printer device 130 controlled by the controller control module 110) to the different printer device 130. In this case, the presenting module 255 may provide the different presentation in a different mode from the first presentation.

Upon receiving the first instruction or the second instruction, the presenting module 255 may present a schedule to be used in a different printer device 130 before the print job corresponding to the first or second instruction is transferred to the different printer device 130.

Figure 3:
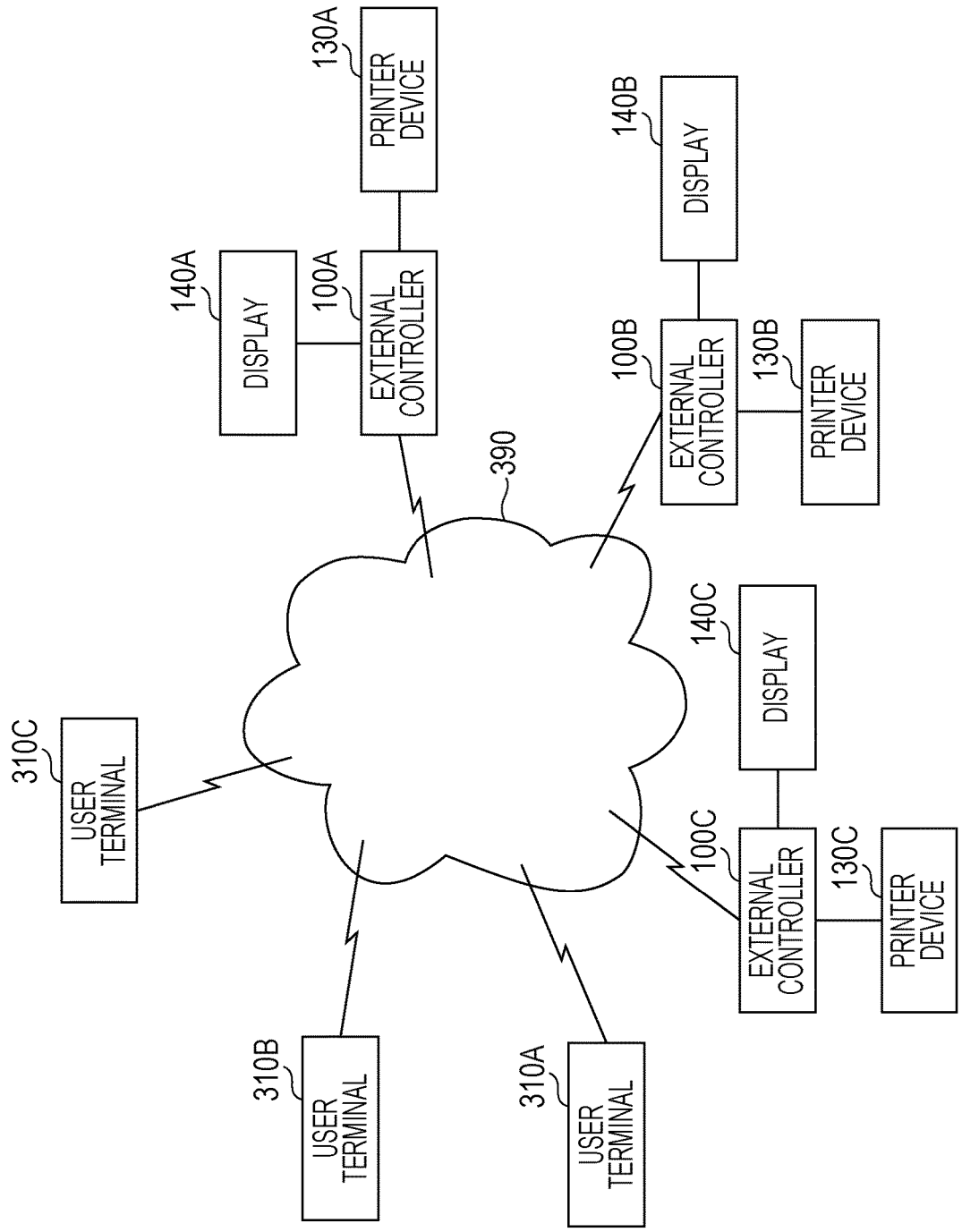
FIG. 3 is a schematic diagram illustrating an example of a system utilizing the exemplary embodiments.

FIG. 3 is a schematic diagram illustrating an example of a system utilizing the exemplary embodiments.

External controllers 100A, 100B, 100C and user terminals 310A, 310B, and 310C are connected to one another via a communication line 390. The communication line 390 may be a wireless or wired medium, or a combination thereof, and may be, for example, the Internet or an intranet as a communication infrastructure. The functions of the external controllers 100 may be implemented as cloud services.

The external controller 100A is connected to a printer device 130A and a display 140A. The external controller 100B is connected to a printer device 130B and a display 140B. The external controller 100C is connected to a printer device 130C and a display 140C.

For example, plural print jobs are sent from plural user terminals 310 to an external controller 100. The external controller 100 generates a schedule of the plural print jobs and presents for a certain print job information that an error or user intervention will occur in this print job on the display 140. The external controller 100 then regenerates a schedule in accordance with the user operation so that no user intervention will occur or the time for which the printer device 130 is unavailable will be decreased. The external controller 100 also presents for a certain print job information that this print job may be executed more efficiently by using a different printer device 130, and transfers this print job to the different printer device 130 in accordance with the user operation.

The above-described processing operations make it possible to rearrange the order of plural print jobs so that user interventions can be handled while keeping the printer device 130 in operation.

In an environment where plural printer devices 130 are operated, it is possible to perform printing efficiently while suitably distributing plural print jobs among the plural printer devices 130 without the need to provide a management server.

Figure 4:
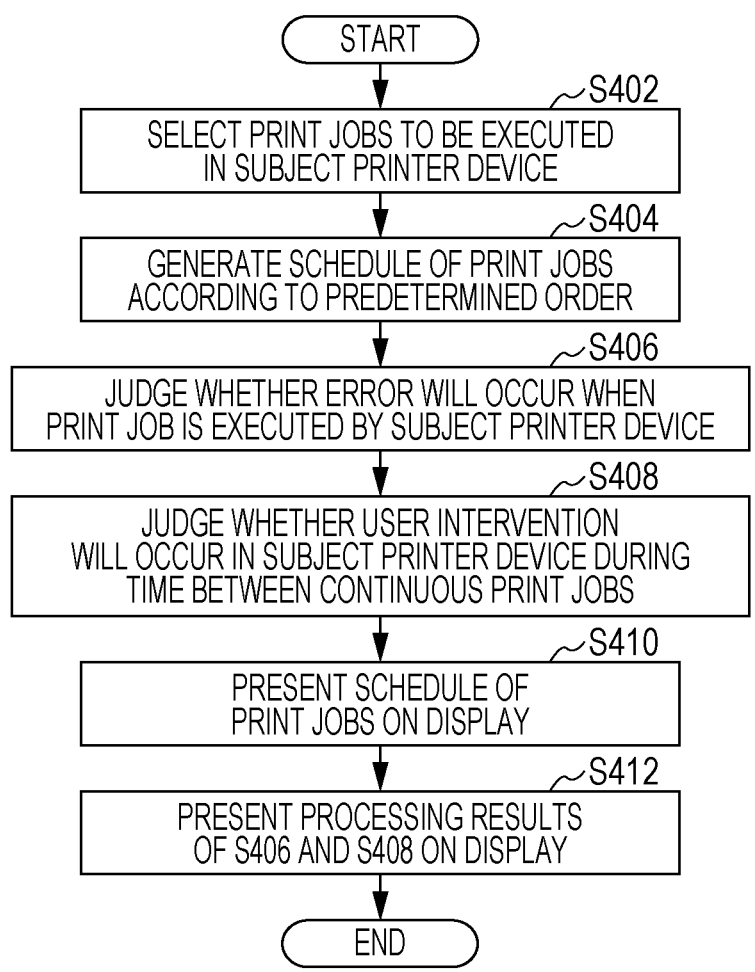
FIG. 4 is a flowchart illustrating an example of processing executed in the first exemplary embodiment.

FIG. 4 is a flowchart illustrating an example of processing executed in the first exemplary embodiment.

In step S402, the print job selecting module 215 selects print jobs to be executed in a subject printer device 130. The print job selecting module 215 selects print jobs from a print job information table 500, for example. FIG. 5 illustrates an example of the data structure of the print job information table 500. The print job information table 500 has a print job ID field 505, a print job name field 510, an owner field 515, a number-of-pages field 520, a number-of-copies field 525, a sheet size field 530, a print document field 535, a color/monochrome field 540, a printed-material output location No. field 545, and a post-processing field 550. The print job ID field 505 indicates information (print job identification (ID)) for uniquely identifying a print job in the exemplary embodiments. The print job name field 510 indicates the name of the print job. The owner field 515 indicates the owner of the print job (owner (end user) of a printed material, which is a final processing result). The number-of-pages field 520 indicates the number of pages of a print document in the print job. The number-of-copies field 525 indicates the number of copies of a print document to be printed in the print job. The sheet size field 530 indicates a sheet size to be used in the print job. The print document field 535 indicates a print document in the print job. In this case, the print document itself may be stored or the location where the print document is stored (such as the document ID, document name, and uniform resource locator (URL)) may be indicated. The color/monochrome field 540 indicates whether the print job requires color printing or monochrome printing. In the color/monochrome field 540, not only color or monochrome, but also spot colors (such as gold, silver, and fluorescent colors) may be specified. The printed-material output location No. field 545 indicates a printed-material output location No. of the printed-material output location of the print job. The post-processing field 550 indicates post-processing (such as stapling, punching, and binding) to be performed in the print job.

In step S404, the schedule generating module 220 generates a schedule of the print jobs according to a predetermined order. The predetermined order may be a chronological order in which the print jobs are selected in step S402 or in which the print jobs are received, or in order in which the print due-date is approaching sooner.

For example, the schedule generating module 220 may calculate the processing time for each print job by using a printer device function table 600 shown in FIG. 6 so as to calculate a processing start time and a processing end time of each print job according to the processing order. FIG. 6 illustrates an example of the data structure of the printer device function table 600. The printer device function table 600 has a printer device ID field 605, a printer device name field 610, a print speed field 615, a remaining toner field 620, a remaining sheet field 630, a number-of-printed-material-output-locations field 640, a post-processing function field 645, and a print cost field 650.

The remaining toner field 620 has an A toner field 622, a B toner field 624, a C toner field 626, and so on. The remaining sheet field 630 has an A4 field 632, an A3 field 634, and so on. The printer device ID field 605 indicates information (printer device ID) for uniquely identifying a printer device in the exemplary embodiments. The printer device name field 610 indicates the name of the printer device. The print speed field 615 indicates the print speed of the printer device. Plural print speed fields may be provided in accordance with plural sheet types (such as A4 size sheet and A3 size sheet). The remaining toner field 620 indicates the current amount of toner in the printer device. The A toner field 622 indicates the remaining amount of A toner. The B toner field 624 indicates the remaining amount of B toner. The C toner field 626 indicates the remaining amount of C toner. Examples of A toner, B toner, C toner, and so on, are black toner, cyan toner, magenta toner, and yellow toner. In addition to remaining toner fields for these colors, the remaining toner field 620 may include remaining toner fields for spot colors that are supported by the printer device. The remaining sheet field 630 indicates the current number of sheets in the printer device. The A4 field 632 indicates the remaining number of A4 sheets. The A3 field 634 indicates the remaining number of A3 sheets. The number-of-printed-material-output-locations field 640 indicates the number of printed-material output locations provided in the printer device. The post-processing function field 645 indicates post-processing functions provided in the printer device. The print cost field 650 indicates the print cost incurred in the printer device.

The schedule generating module 220 may calculate the processing time for each print job in the schedule by the number of pages to be printed in the print job (calculated by using the number-of-pages field 520 and the number-of-copies field 525 of the print job information table 500) and by the print speed of the printer device 130 (the print speed field 615 of the printer device function table 600).

In step S406, the error-occurrence judging module 230 judges whether an error will occur when a corresponding print job is executed by the printer device 130. The error-occurrence judging module 230 may make this judgement by determining whether the printer device 130 (more specifically, data indicated in the printer device function table 600) can handle processing indicated by the print job information table 500.

For example, if the print job indicates that a spot color such as gold will be used (this spot color is specified in the color/monochrome field 540 of the print job information table 500) and if the printer device 130 does not support this spot color (the remaining toner field 620 of the printer device function table 600 does not include a field for this spot color), the error-occurrence judging module 230 judges that an error will occur.

If the print job indicates that stapling will be performed (stapling is specified in the post-processing field 550 of the print job information table 500) and if the printer device 130 does not have a stapling function as a post-processing function (the post-processing function field 645 of the printer device function table 600 does not indicate a stapling function), the error-occurrence judging module 230 judges that an error will occur.

In step S408, the intervention-occurrence judging module 235 judges whether a user (operator) intervention will occur in the printer device 130 during a time between continuous print jobs.

For example, the intervention-occurrence judging module 235 judges whether the printed-material output location to be used in the current print job will be the same as that in the previous job, as discussed above, by referring to the printed-material output location No. field 545 of the print job information table 500. The intervention-occurrence judging module 235 also judges whether the post-processing to be performed in the current print job will the same as that in the previous job by referring to the post-processing field 550 of the print job information table 500. In this case, if the post-processing to be performed in the current job and that in the previous job are the same, it is assumed that the printed-material output locations will be the same.

The intervention-occurrence judging module 235 judges whether the printer device will be out of print sheets while performing printing in the following manner. The intervention-occurrence judging module 235 first calculates the number of sheets to be used in the print job by referring to the number-of-pages field 520, the number-of-copies field 525, and the sheet size field 530 of the print job information table 500, and then makes the above-described judgement by referring to the remaining sheet field 630 of the printer device function table 600.

The intervention-occurrence judging module 235 judges whether the printer device will be out of toner while performing printing in the following manner. The intervention-occurrence judging module 235 first calculates the amount of toner to be used in the print job by referring to the number-of-pages field 520, the number-of-copies field 525, and the color/monochrome field 540 of the print job information table 500, and then makes the above-described judgement by referring to the remaining toner field 620 of the printer device function table 600. When calculating the amount of toner, the intervention-occurrence judging module 235 may calculate the amount of toner required for every group of predetermined number of pages or may analyze the document indicated in the print document field 535 and calculate the amount of toner required for the document.

As the processing time to be taken to perform a user intervention (such as removing of a printed material, reloading of sheets, or refilling of toner), a predetermined time is used. For example, a statistical value (such as the average, median, or mode) calculated by using the past records may be used.

In step S410, the presenting module 255 presents the schedule of the print jobs on the display 140.

In step S412, the presenting module 255 presents the processing results of steps S406 and S408 on the display 140.

In steps S410 and S412, the presenting module 255 presents the schedule and the processing results, such as those on a screen 700 shown in FIG. 7.

FIG. 7 illustrates a presentation example according to the first exemplary embodiment. The screen 700 is an example of the display results obtained as a result of selecting plural print jobs from among print jobs reserved in the print job storage module 210 in accordance with the user operation and executing prediction processing as in the example in FIG. 4.

On the screen 700, print job fields 710, 720, 730, 740, and 750, a "reschedule" button 790, and a "print" button 795 are displayed.

In the print job fields 710 through 750, print jobs 1 through 5 are displayed in this order. In the print job field 710, as the print job 1, "print" 712 and "remove sheets from output location" 714 are displayed. In the print job field 720, as the print job 2, "change sheets" 722 and "print" 724 are displayed. In the print job field 730, as the print job 3, "print" 732 is displayed. In the print job field 740, as the print job 4, "print job error" 742 is displayed. In the print job field 750, as the print job 5, "print/post-processing" 752 is displayed. The time flow (from the present to the future) is represented from the left to the right.

In the print jobs 1 through 5, "print job error" 742 is an error, "remove sheets from output location" 714 and "change sheets" 722 are user interventions. Situations that are possible to handle by user operation are described as warnings (indicated by the thick dotted lines in FIG. 7), while a situation that is not possible to handle by user operation is described as an error (indicated by the thin dotted lines in FIG. 7).

The operations, user interventions, and errors in the printed jobs are distinguished from each other by the line type, such as the thick solid lines, thick dotted lines, thin dotted lines, long dashed dotted lines, and long dashed double-dotted lines. However, the operations, user interventions, and errors in the printed jobs may be distinguished from each other by color (such as blue, yellow, red, purple, and green). Instead of using colors and line types, characters, drawings, symbols, configurations, patterns, hues, a dynamic change (such as flash and animated graphics), blinking, sound, and a combination thereof may be used. If blinking is used, operations, user interventions, and errors in the printed jobs may be distinguished from each other according to whether blinking is performed, the period for which blinking continues, or the interval of blinking.

If a check box at the head of a print job field is checked, print processing for this print job is started upon detecting the "print" button 795 is pressed. In the example in FIG. 7, the check box of the print job field 740 concerning the print job 4 in which an error will occur is not checked as a default. The check boxes of the other print job fields 710, 720, 730, and 750 are checked as a default.

Presenting a print schedule, such as that shown in FIG. 7, enables a user to understand when to change sheets, for example, without having to constantly watch the print progress. The user also recognizes which print job will not be processed, and is thus able to take certain measures. For example, the user does not select such a print job or causes another printer device 130 to perform printing.

A description will be given below, with reference to FIGS. 8 and 9, of processing to be executed when it is detected that the "reschedule" button 790 is pressed. That is, schedule regenerating processing will be described.

Figures 8, 9:
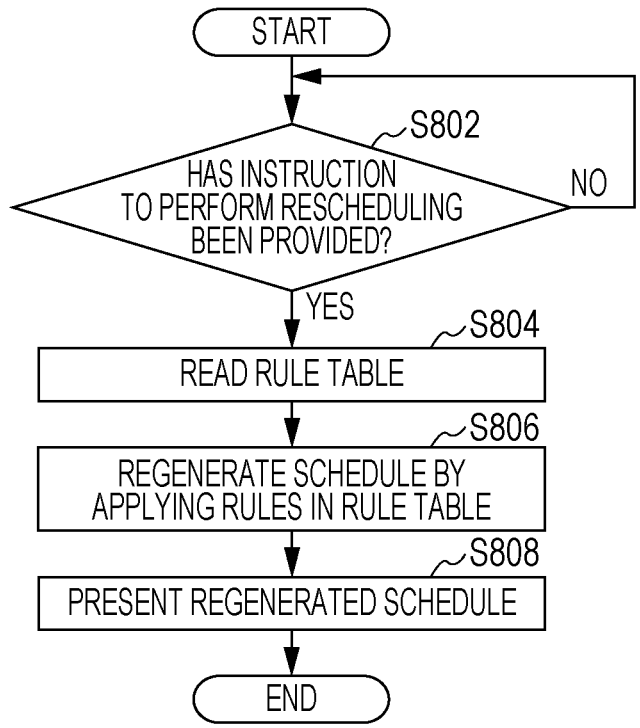
FIG. 8 is a flowchart illustrating an example of processing executed in the first exemplary embodiment.
FIG. 9 illustrates an example of the data structure of a rule table.

FIG. 8 is a flowchart illustrating an example of processing executed in the first exemplary embodiment.

In step S802, the schedule regenerating module 240 judges whether an instruction to perform rescheduling has been provided. If such an instruction has been provided, the process proceeds to step S804. If such an instruction has not been provided, the schedule regenerating module 240 waits until an instruction is provided. In step S802, the schedule regenerating module 240 judges whether the "reschedule" button 790 is pressed.

In step S804, the schedule regenerating module 240 reads a rule table 900. FIG. 9 illustrates an example of the data structure of the rule table 900. The rule table 900 has a rule ID field 910 and a rule field 920. The rule ID field 910 indicates information (rule ID) for uniquely identifying a rule in the exemplary embodiments. The rule field 920 indicates the content of the rule of the rule ID.

The rule ID R01 is "printed-material output location to be used in a first print job is different from that in a second print job". This rule means that, after a print job using a certain printed-material output location has been executed, a print job using another printed-material output location is executed. The rule ID R02 is that a sheet feeder to be used in a first print job is different from that in a second print job. The rule ID R03 is that the toner type to be used in a first print job is different from that in a second print job.

In step S806, the schedule regenerating module 240 regenerates a schedule by applying the rules in the rule table 900.

In step S808, the presenting module 255 presents the regenerated schedule.

Figure 10:
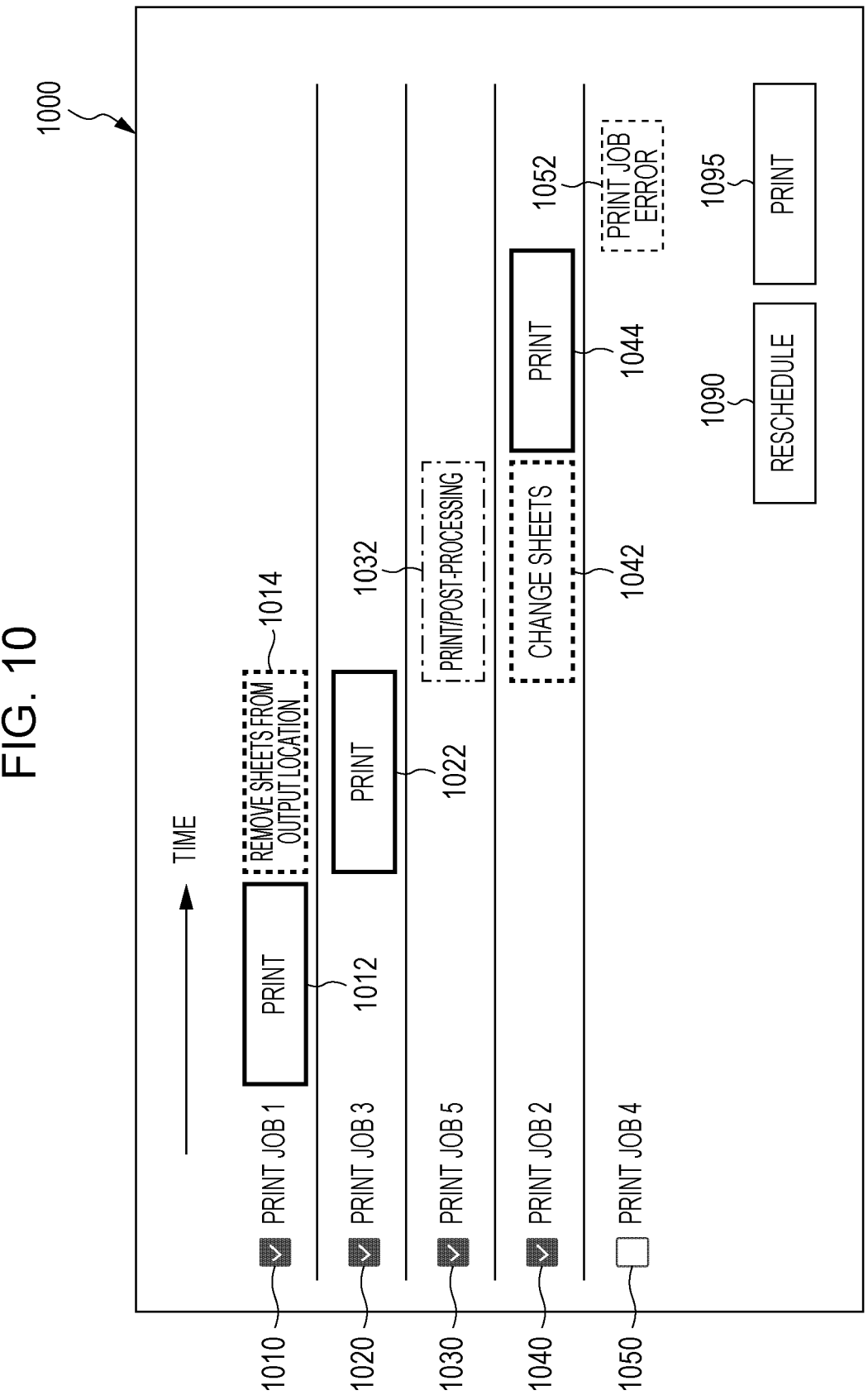
FIG. 10 illustrates a presentation example according to the first exemplary embodiment.

In step S808, the presenting module 255 presents a screen, such as a screen 1000 shown in FIG. 10.

FIG. 10 illustrates a presentation example according to the first exemplary embodiment.

Upon detecting that the "reschedule" button 790 is pressed, the schedule regenerating module 240 rearranges the order of print jobs by preferentially selecting print jobs which do not require any user intervention. The schedule regenerating module 240 also rearranges the order of print jobs so that print jobs which require a user intervention will not interfere with operation of the printer device 130 by applying the rules in the rule table 900, for example.

On the screen 1000, print job fields 1010, 1020, 1030, 1040, and 1050, a "reschedule" button 1090, and a "print" button 1095 are displayed.

In the example in FIG. 10, the print job 1 (print job field 710) shown in FIG. 7 remains in the first place (print job field 1010). The print job 2 (print job field 720) shown in FIG. 7 is moved to the fourth place (pint job field 1040), the print job 3 (print job field 730) shown in FIG. 7 is moved to the second place (print job field 1020), the print job 4 (print job field 740) shown in FIG. 7 is moved to the fifth place (print job field 1050), and the print job 5 (print job field 750) shown in FIG. 7 is moved to the third place (print job field 1030).

A user intervention "remove sheets from output location" 1014 is performed at the same time as "print" 1022, and a user intervention "change sheets" 1042 is performed at the same time as "print/post-processing" 1032. By simultaneously performing a user intervention and a print operation together, the downtime of the printer device 130 is decreased.

In the example in FIG. 10, a longer time period is assigned to user interventions "remove sheets from output location" 1014 and "change sheets" 1042 than the counterparts in the example in FIG. 7. This means that the user can take time to perform such a user intervention, in other words, the user can perform a user intervention at any time point within the assigned time period.

A description will be given, with reference to FIGS. 11 through 13, an example of processing to be executed when transferring a print job in which an error or a user intervention will occur to another printer device.

Figure 11:
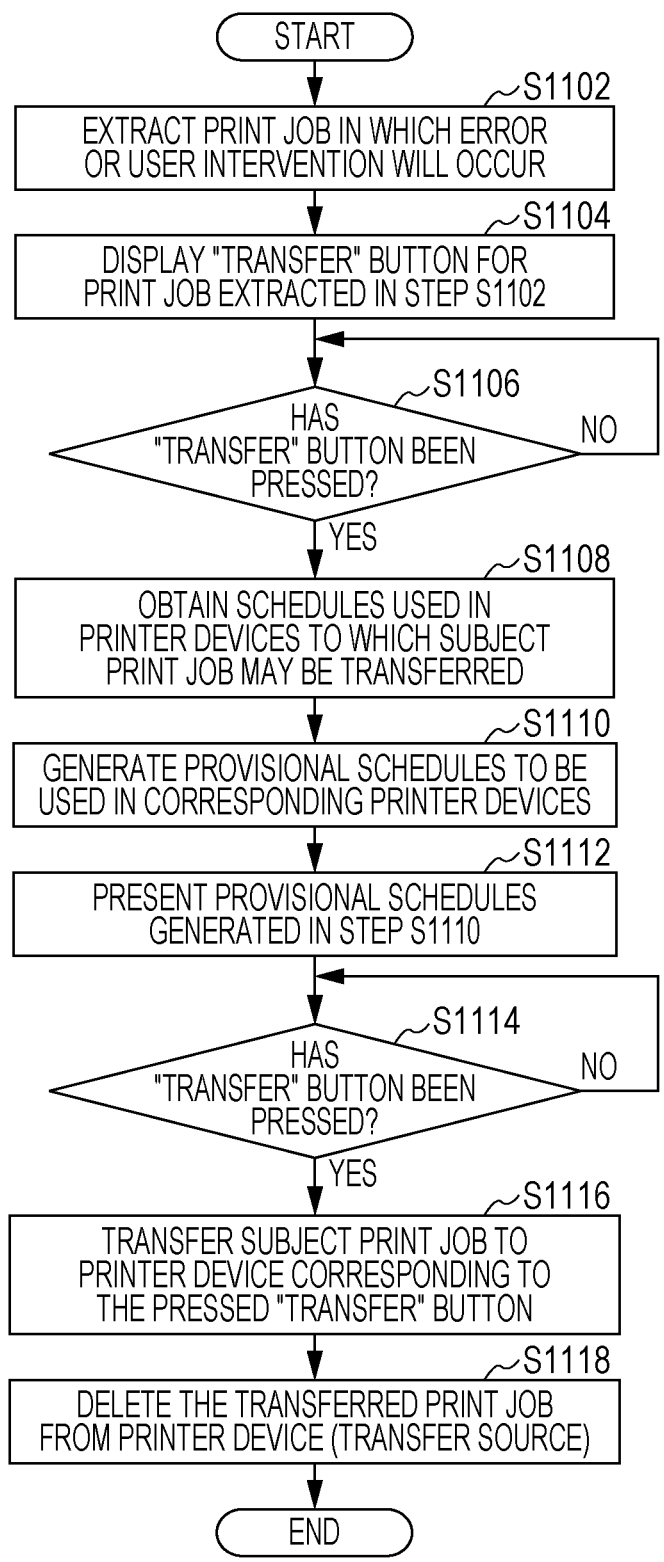
FIG. 11 is a flowchart illustrating an example of processing executed in the first exemplary embodiment.

FIG. 11 is a flowchart illustrating an example of processing executed in the first exemplary embodiment.

In step S1102, the print job transfer module 245 extracts a print job in which an error or a user intervention will occur. If processing in the example of FIG. 4 or 8 is executed, the print job transfer module 245 extracts a print job by using the result of processing of FIG. 4 or 8. The print job transfer module 245 may alternatively execute steps S406 and S408.

In step S1104, the presenting module 255 displays a "transfer" button for the print job extracted in step S1102.

Figure 12:
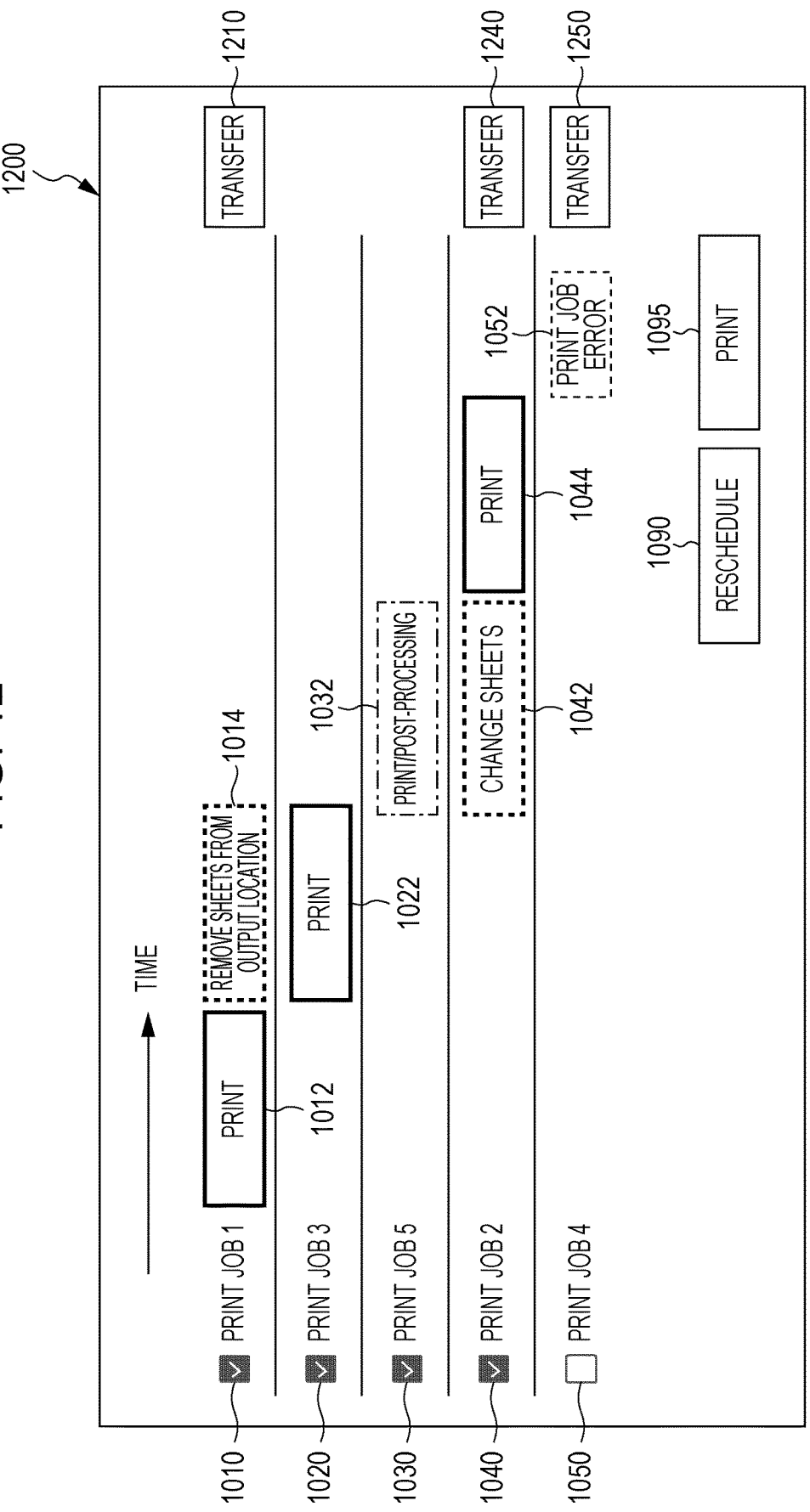
FIG. 12 illustrates a presentation example according to the first exemplary embodiment.

The presenting model 255 presents "transfer" buttons, such as those on a screen 1200 in FIG. 12, for example. FIG. 12 illustrates a presentation example according to the first exemplary embodiment. The screen 1200 is a screen in which "transfer" buttons 1210, 1240, and 1250 are added to the screen 1000 shown in FIG. 10.

More specifically, the "transfer" button 1210 is added to the print job 1 which requires "remove sheets from output location" 1014. The "transfer" button 1240 is added to the print job 2 which requires "change sheets" 1042. The "transfer" button 1250 is added to the print job 4 in which "print job error" 1052 will occur.

In step S1106, the print job transfer module 245 judges whether a "transfer" button has been pressed. If a "transfer" button has been pressed, the process proceeds to step S1108. If no "transfer" button has been pressed, the print job transfer module 245 waits until a "transfer" button is pressed. By pressing a "transfer" button, the user is able to select a printer device to which a corresponding print job will be transferred as a result of executing steps S1106 through S1114.

In step S1108, the print job transfer module 245 obtains schedules used in printer devices to which the extracted print job may be transferred.

In step S1110, the transfer destination schedule generating module 250 generates provisional schedules to be used in the corresponding individual printer devices.

In step S1112, the presenting module 255 presents the provisional schedules generated in step S1110.

Figure 13:
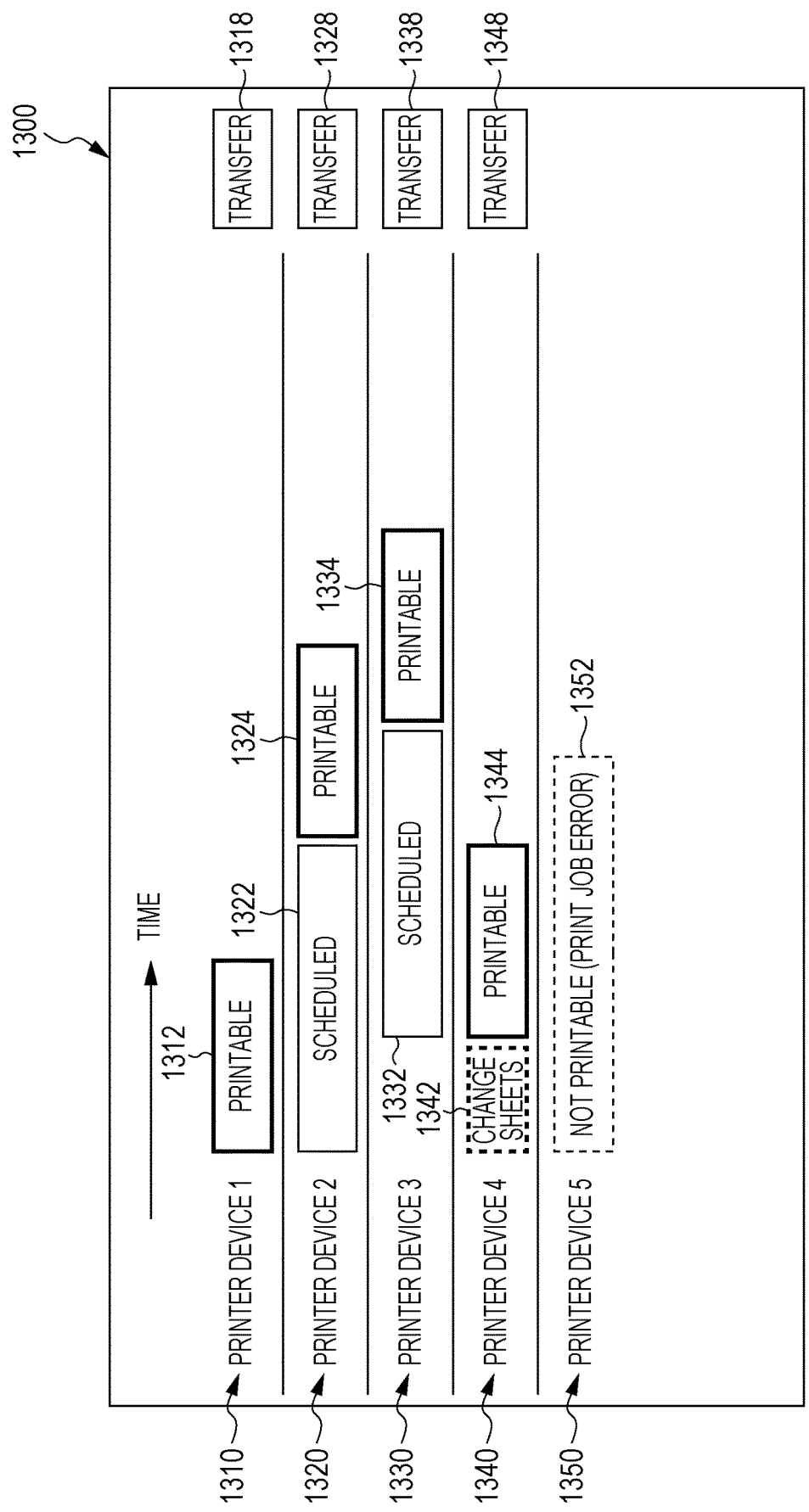
FIG. 13 illustrates a presentation example according to the first exemplary embodiment.

The presenting module 255 presents the provisional schedules, such as those on a screen 1300 in FIG. 13, for example. FIG. 13 illustrates a presentation example according to the first exemplary embodiment. The screen 1300 is a printer device selection screen which displays during which time period a selected print job can be printed. On the screen 1300, printer device fields 1310, 1320, 1330, 1340, and 1350 are displayed. In the printer device field 1310, "printable" 1312 and a "transfer" button 1318 are displayed. In the printer device field 1320, "scheduled" 1322, "printable" 1324, and a "transfer" button 1328 are displayed. In the printer device field 1330, "scheduled" 1332, "printable" 1334, and a "transfer" button 1338 are displayed. In the printer device field 1340, "change sheets" 1342, "printable" 1344, and a "transfer" button 1348 are displayed. In the printer device field 1350, "not printable (print job error)" 1352 is displayed.

That is, as candidates of the transfer destinations, five printer devices (printer device 1, printer device 2, printer device 3, printer device 4, and printer device 5) are available. The screen 1300 shows the provisional schedules in the corresponding printer devices 1 through 5. If a printer device is not executing any printer processing and no schedule is made for this printer device and if this printer device is able to process the subject print job for printing, a printer device field for this printer device is displayed, as in the printer device field 1310. If a schedule is made for a printer device and if this printer device is able to process the subject print job for printing, a printer device field is displayed, as in the printer device fields 1320 and 1330.

While the printer devices 1, 2, and 3 do not require changing of sheets, the printer device 4 requires changing of sheets. This means that sheets required in the subject print job are not set in the printer device 4.

A "transfer" button is not displayed in the printer device field 1350. The reason for this is that the printer device 5 is unable to perform printing even if the subject print job is transferred to the printer device 5.

In step S1114, the print job transfer module 245 judges whether a "transfer" button has been pressed. If a "transfer" button has been pressed, the process proceeds to step S1116. If no "transfer" button has been pressed, the print job transfer module 245 waits until a "transfer" button is pressed. Examples of a "transfer button" are the "transfer" buttons 1318, 1328, 1338, and 1348 shown in FIG. 13.

In step S1116, the print job transfer module 245 transfers the subject print job to the printer device for which the "transfer" button has been pressed.

In step S1118, the print job transfer module 245 deletes the transferred print job from the printer device (transfer source) and also from the schedule.

A description will be given below, with reference to FIGS. 14 and 15, of processing for transferring a print job which may be executed more efficiently by using a different printer device than by a subject printer device to the different printer device.

Figure 14:
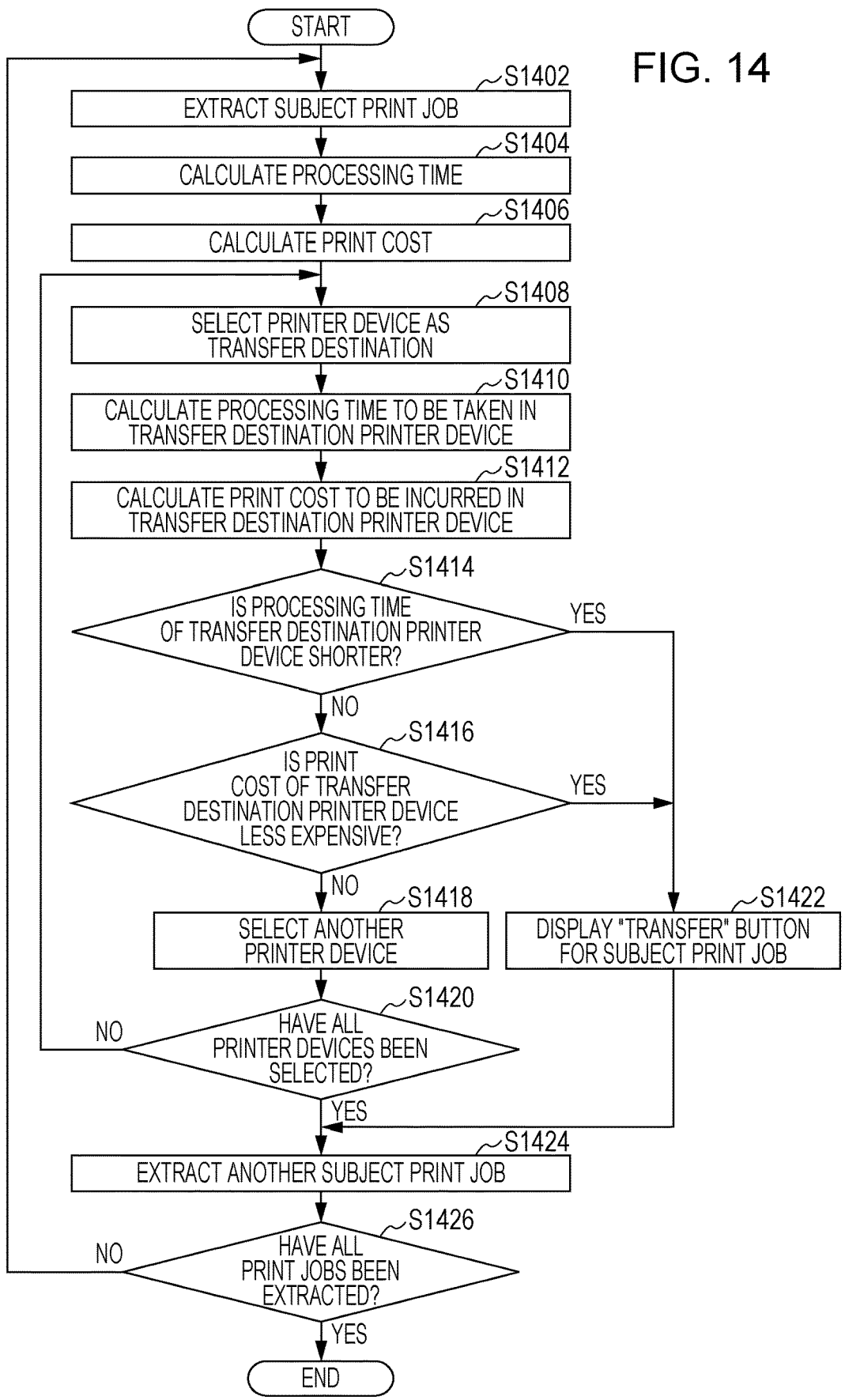
FIG. 14 is a flowchart illustrating an example of processing executed in the first exemplary embodiment.

FIG. 14 is a flowchart illustrating an example of processing executed in the first exemplary embodiment.

In step S1402, a subject print job is extracted. For example, a print job included in the schedule may be extracted according to the processing order. One of print jobs in which an error or a user intervention will occur may be extracted.

In step S1404, the processing time is calculated. For example, as discussed above, the processing time is calculated by the number of pages to be printed in the print job (calculated by using the number-of-pages field 520 and the number-of-copies field 525 of the print job information table 500) and by the print speed of the printer device 130 (the print speed field 615 of the printer device function table 600). The processing end time of the subject print job on the schedule may be calculated. It is assumed, for example, that one printer device 130 is scheduled to finish printing at 15:00, while the other printer device at 10:00 because the other printer device 130 has less print jobs to process. In this case, the other printer device 130 is more likely to be selected even if the processing speed of the other printer device 130 is slower.

In step S1406, the print cost of the print job is calculated. The print cost may be calculated by the unit price (the unit price of sheets and the print cost (print cost field 650 in the printer device function table 600)) and the number of pages to be printed.

In step S1408, a printer device to which the subject print job will be transferred is selected.

In step S1410, the processing time to be taken in the printer device selected as the transfer destination is calculated. The processing time to be taken if the subject print job is processed in the transfer destination printer device is calculated in a manner similar to step S1404.

In step S1412, the print cost in the transfer destination printer device is calculated. The print cost to be incurred if the subject print job is processed in the transfer destination printer device is calculated in a manner similar to step S1406.

In step S1414, it is judged whether the processing time of the transfer destination printer device is shorter than that of the transfer source printer device. If the processing time of the transfer destination printer device is shorter, the process proceeds to step S1422. If the processing time of the transfer destination printer device is not shorter, the process proceeds to step S1416.

In step S1416, it is judged whether the print cost of the transfer destination printer device is less expensive than that of the transfer source printer device. If the print cost of the transfer destination printer device is less expensive, the process proceeds to step S1422. If the print cost of the transfer destination printer device is not less expensive, the process proceeds to step S1418.

In step S1418, another printer device is selected.

In step S1420, it is judged whether all the printer devices have been selected. If all the printer devices have been selected, the process proceeds to step S1424. If not all the printer devices have been selected, the process returns to step S1408.

In step S1422, a "transfer" button for the subject print job is displayed. In this case, the "transfer" button is displayed in a different mode from that displayed in step S1104 of FIG. 11. For example, the "transfer" button may be indicated by the dotted lines, as shown in FIG. 15.

In step S1424, another print job is extracted.

In step S1426, it is judged whether all the print jobs have been extracted. If all the print jobs have been extracted, the processing is completed. If not all the print jobs have been extracted, the process returns to step S1402.

Thereafter, operations similar to steps S1106 through S1118 in the example in FIG. 11 are executed.

Figure 15:
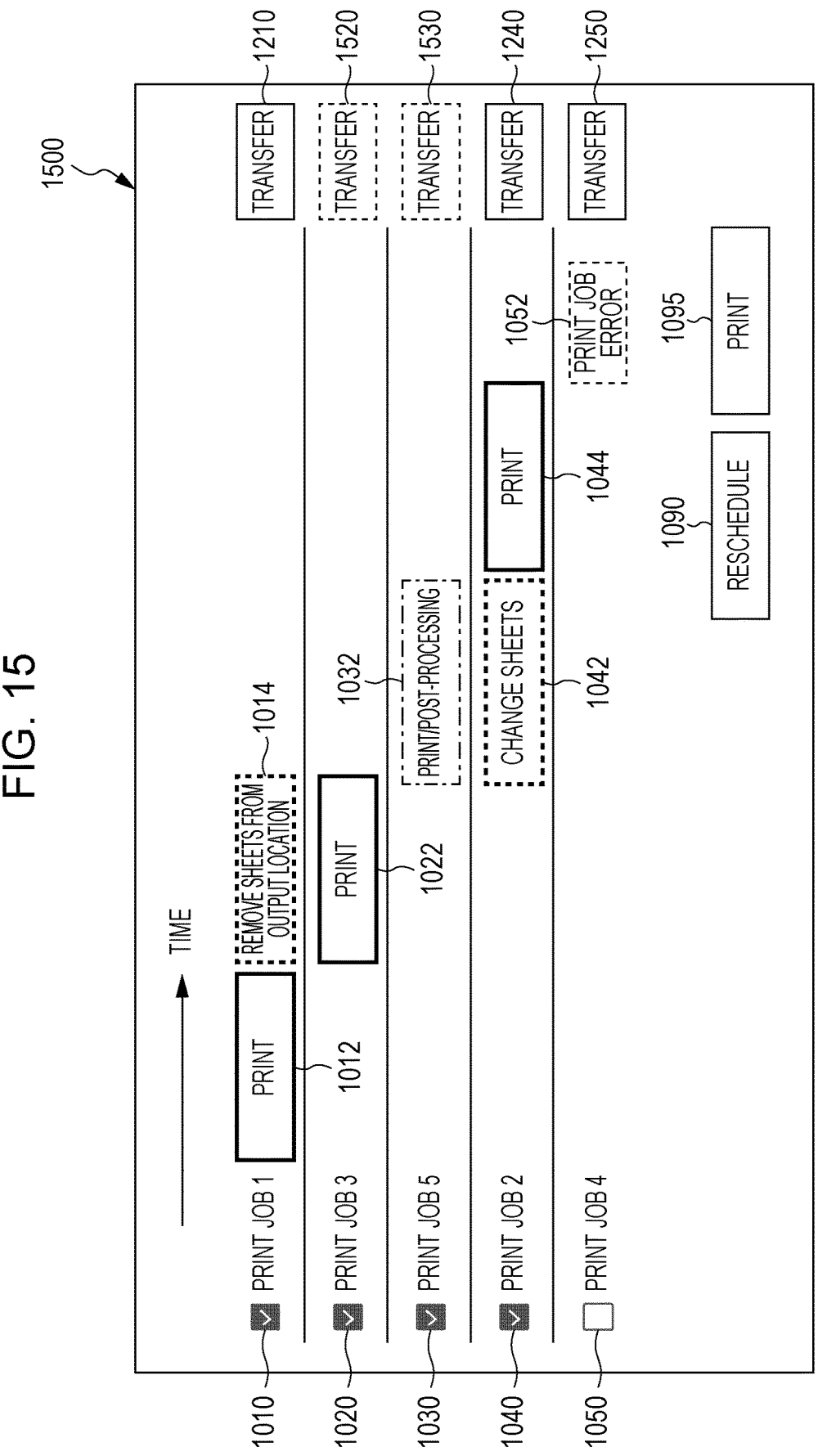
FIG. 15 illustrates a presentation example according to the first exemplary embodiment.

As a result of executing the processing in FIG. 14, a screen 1500 shown in FIG. 15, for example, is presented.

FIG. 15 illustrates a presentation example according to the first exemplary embodiment. The screen 1500 is a screen in which more "transfer" buttons are added to the screen 1200 shown in FIG. 12, and more specifically, "transfer" buttons are added to print jobs which have been found to be executed more efficiently by using another printer device 130 as a result of executing the processing in FIG. 14.

More specifically, a "transfer" button 1520 is added to the print job 3 in the print job field 1020, and a "transfer" button 1530 is added to the print job 5 in the print job field 1030. That is, the print jobs 3 and 5 are jobs that will be executed more efficiently by using another printer device 130. The display mode of the "transfer" buttons 1520 and 1530 is different from that of the "transfer" buttons 1210, 1240, and 1250 so as to distinguish a transfer operation for enhancing the processing efficiency from a transfer operation for preventing the occurrence of an error or a user intervention.

Second Exemplary Embodiment

Figure 16:
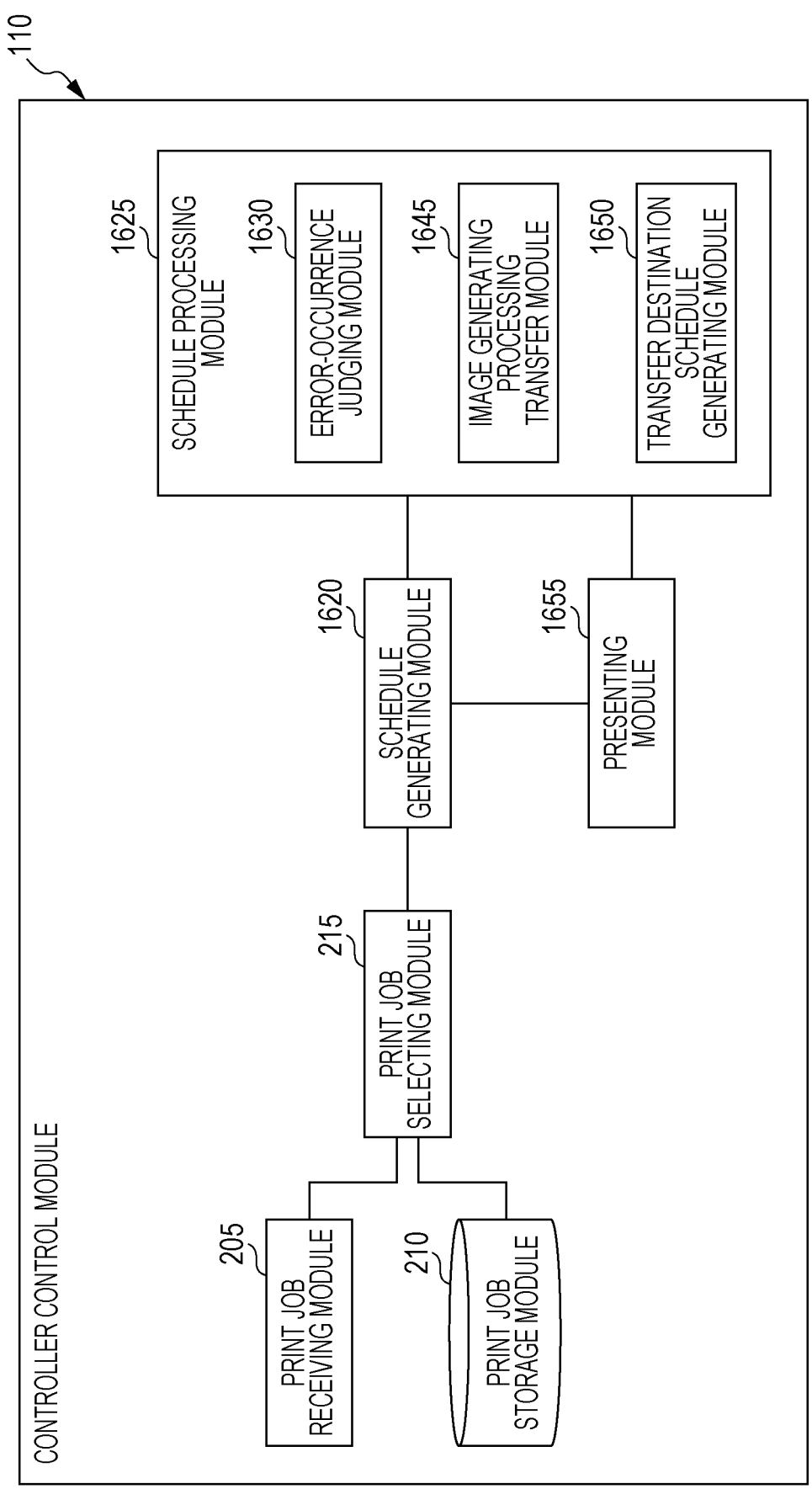
FIG. 16 is a block diagram of conceptual modules forming an example of the configuration of a second exemplary embodiment.

FIG. 16 is a block diagram of conceptual modules forming an example of the configuration of a second exemplary embodiment.

During a time from when a print job is received until when a printed material is produced, at least two operations are performed: (1) processing for generating an image to be printed; and (2) processing for printing this image by using a printer device 130. Only processing (1) may be executed on plural print jobs first to generate and store images, and then, only processing (2) may be executed on the plural print jobs. This can enhance the operation efficiency of a printer device 130. For example, processing (1) is executed at nighttime, and processing (2) is executed the next morning. The second exemplary embodiment is intended only for processing (1). The first exemplary embodiment may be intended for both of processing (1) and processing (2) or only for processing (2).

Typically, processing (1) is called raster image processor (RIP) processing. A RIP is a processing mechanism in which print data described in a page description language (PDL), such as Portable Document Format (PDF), is converted into a raster image that can be recorded on a sheet by using a printer device. A RIP may be implemented by either one of dedicated hardware and software operating on a general-purpose computer.

As shown in FIG. 16, a controller control module 110 includes a print job receiving module 205, a print job storage module 210, a print job selecting module 215, a schedule generating module 1620, a schedule processing module 1625, and a presenting module 1655. Elements similar to those of the first exemplary embodiment are designated by like reference numerals, and an explanation thereof will thus be omitted.

The print job receiving module 205 is connected to the print job selecting module 215.

The print job storage module 210 is connected to the print job selecting module 215.

The print job selecting module 215 is connected to the print job receiving module 205, the print job storage module 210, and the schedule generating module 1620.

The schedule generating module 1620 is connected to the print job selecting module 215, the schedule processing module 1625, and the presenting module 1655. The schedule generating module 1620 generates a schedule of processing for generating images of plural print jobs to be printed by a printer device 130. That is, the schedule generating module 1620 determines the order of plural print jobs to be subjected to RIP processing. The schedule generating module 1620 may generate a schedule by rearranging print jobs in chronological order in which the print jobs are selected by the print job selecting module 215, or in which the print jobs are received by the print job receiving module 205, or in order in which the print due-date is approaching sooner, or in order in which print processing will be performed according to the schedule made in the first exemplary embodiment.

The schedule processing module 1625 includes an error-occurrence judging module 1630, an image generating processing transfer module 1645, and a transfer destination schedule generating module 1650. The schedule processing module 1625 is connected to the schedule generating module 1620 and the presenting module 1655. The schedule processing module 1625 executes processing concerning a schedule generated by the schedule generating module 1620.

The error-occurrence judging module 1630 judges (predicts), for each of print jobs for which scheduling has been made by the schedule generating module 1620, whether an error will occur when RIP processing is performed on a corresponding print job. For example, if software (program) for performing RIP processing on print data to be printed is not installed in a printer device 130 (including a case in which the printer device 130 does not have a license to use this software or such a license has expired), if a print job indicates that a print document will be printed by using a font or a color which is not provided in a printer device 130, or if print data requires higher performance than that of a printer device 130 (for example, print data requires drawing of fine lines that are not possible to reproduce in the printer device 130), or if a printer device 130 does not have resource data to be used in variable-data printing (for example, the printer device 130 does not have address data to be used in variable address-data printing), the error-occurrence judging module 1630 judges that an error will occur.

A user intervention may occur in the first exemplary embodiment, but not in the second exemplary embodiment. The reason for this is that a situation change which occurs according to the progress of processing, such as a shortage of sheets, does not influence processing in the second exemplary embodiment. A combination of a subject which executes processing (such as the external controller 100 and the printer device 130) and a document to be printed determines whether processing can be executed successfully. That is, user interventions are not required in the second exemplary embodiment.

A printer device 130 may include a controller control module 110. Likewise, another printer device 130 may include another controller control module 110.

Upon receiving a first instruction, the image generating processing transfer module 1645 transfers a subject print job to another printer device 130.

Upon receiving the first instruction or a second instruction concerning a certain print job, the transfer destination schedule generating module 1650 generates a schedule to be used in another printer device 130 before the print job is transferred to this printer device 130. That is, the transfer destination schedule generating module 1650 requests this printer device 130 to send the schedule used in this printer device 130.

The presenting module 1655 is connected to the schedule generating module 1620 and the schedule processing module 1625. Concerning a print job in which an error will occur, the presenting module 1655 presents such a print job in a different mode from another print job by using the schedule.

The presenting module 1655 may provide a first presentation that makes it possible to receive a first instruction to transfer a print job in which an error will occur to another printer device 130.

The presenting module 1655 may provide a different presentation that makes it possible to receive a second instruction to transfer a print job which may be executed more efficiently by using a different printer device 130 than by using the printer device 130 controlled by the controller control module 110 to the different printer device 130. In this case, the presenting module 1655 may provide the different presentation in a different mode from the first presentation.

Upon receiving the first instruction or the second instruction, the presenting module 1655 may present a schedule to be used in a different printer device 130 before the print job corresponding to the first or second instruction is transferred to this printer device 130.

Figure 17:
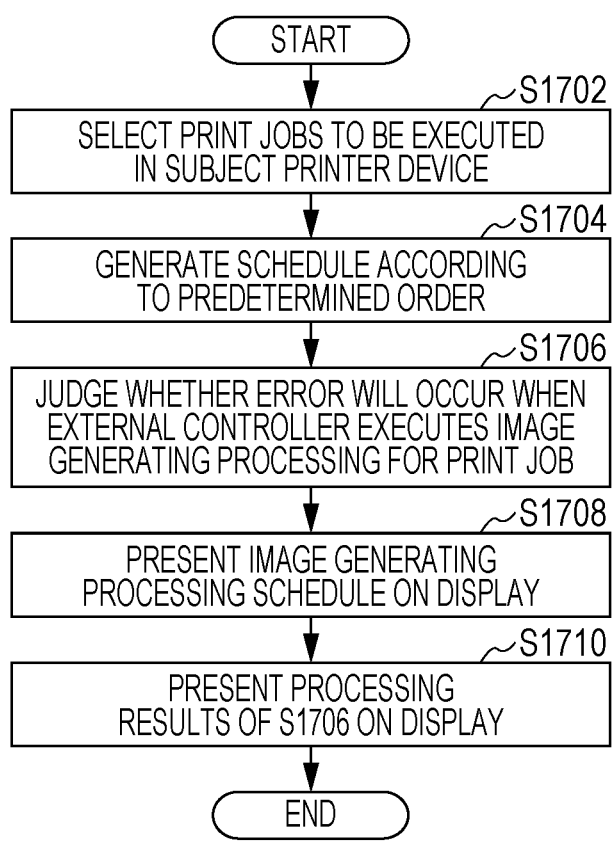
FIG. 17 is a flowchart illustrating an example of processing executed in the second exemplary embodiment.

FIG. 17 is a flowchart illustrating an example of processing executed in the second exemplary embodiment.

In step S1702, the print job selecting module 215 selects print jobs to be executed in a subject printer device 130. The print job selecting module 215 executes processing similar to step S402 of FIG. 4. The print job selecting module 215 also obtains a document data table 1800 concerning a document to be printed. FIG. 18 illustrates an example of the data structure of the document data table 1800. The document data table 1800 has a document ID field 1805, a document name field 1810, a document mode field 1815, a number-of-pages field 1820, a color/monochrome field 1825, a font field 1830, and an image generating program field 1835. The document ID field 1805 indicates information (document ID) for uniquely identifying a document in the exemplary embodiments. The document name field 1810 indicates the name of the document of this document ID. The document mode field 1815 indicates the mode of the document (for example, a PDL, such as PDF, or the compression mode). The number-of-pages field 1820 indicates the number of pages of the document. The color/monochrome field 1825 indicates whether color printing or monochrome printing will be performed on the document. In the color/monochrome field 1825, not only color or monochrome, but also spot colors (such as gold, silver, and fluorescent colors) may be specified. The font field 1830 indicates the font type used in the document. The image generating program field 1835 indicates a program for generating an image of the document.

In step S1704, the schedule generating module 1620 generates a schedule of image generating processing according to a predetermined order. The predetermined order may be a chronological order in which the print jobs are selected in step S1702 or in which the print jobs are received, or in order in which the print due-date is approaching sooner, or in order in which print processing will be performed according to the schedule made in the first exemplary embodiment.

For example, the schedule generating module 1620 calculates the processing time to be taken for each print job by using an image processing performance table 1900 so as to calculate the processing start time and the processing end time according to the processing order. FIG. 19 illustrates an example of the data structure of the image processing performance table 1900. The image processing performance table 1900 has an external controller field 1905, an image generating program field 1910, a font field 1915, a processing speed field 1920, and a processing cost field 1925. The external controller field 1905 indicates identification information concerning a subject external controller. The image generating program field 1910 indicates the image generating program stored in the external controller. The font field 1915 indicates font types provided in the external controller. The processing speed field 1920 indicates the processing speed of the external controller. The processing cost field 1925 indicates the processing cost incurred in the external controller.

The processing time for each print job in the schedule is calculated by the number of pages of the document (the number-of-pages field 1820 of the document data table 1800) and by the processing speed of the external controller 100 (the processing speed field 1920 of the image processing performance table 1900).

In step S1706, the error-occurrence judging module 1630 judges as described above whether an error will occur when the external controller 100 executes image generating processing for a print job. The error-occurrence judging module 1630 may make this judgement by using the image processing performance table 1900.

For example, if the font type (the font field 1830 of the document data table 1800) required for the print job is not included in the font types (the font field 1915 of the image processing performance table 1900) provided in the external controller 100, the error-occurrence judging module 1630 judges that an error will occur.

In step S1708, the presenting module 1655 presents the image generating processing schedule on the display 140.

In step S1710, the presenting module 1655 presents the processing results of step S1706 on the display 140.

Figure 20:
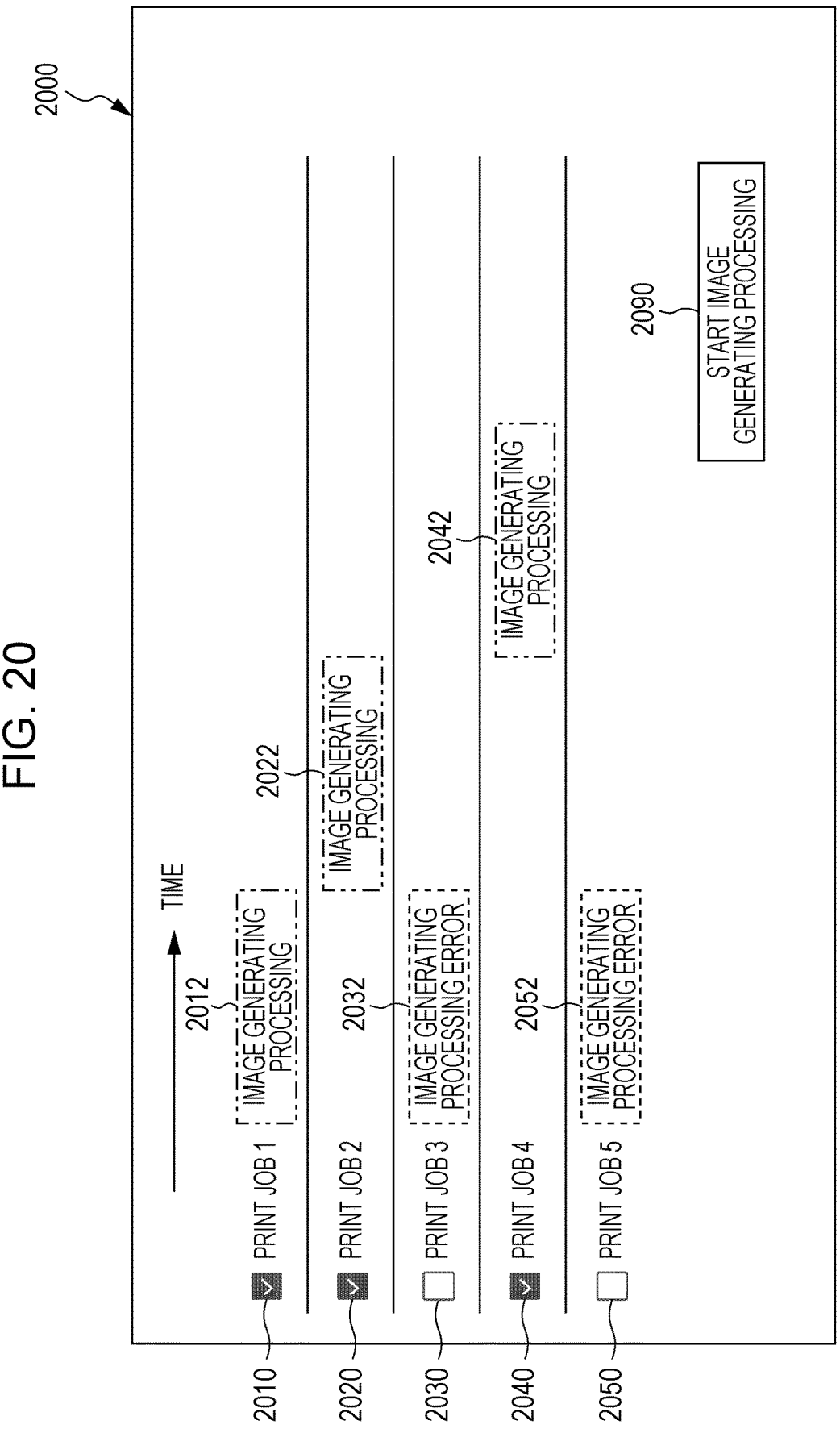
FIG. 20 illustrates a presentation example according to the second exemplary embodiment.

In steps S1708 and S1710, the presenting module 1655 presents the schedule and the processing results, such as those on a screen 2000 shown in FIG. 20.

FIG. 20 illustrates a presentation example according to the second exemplary embodiment. The screen 2000 is an example of the display results obtained as a result of selecting plural print jobs from among the print jobs reserved in the print job storage module 210 in accordance with the user operation and executing prediction processing for print jobs (for image generating processing) as in the example in FIG. 17.

On the screen 2000, print job fields 2010, 2020, 2030, 2040, and 2050 and a "start image generating processing" button 2090 are displayed.

In the print job fields 2010 through 2050, print jobs 1 through 5 are displayed in this order. In the print job field 2010, as the print job 1, "image generating processing" 2012 is displayed. In the print job field 2020, as the print job 2, "image generating processing" 2022 is displayed. In the print job field 2030, as the print job 3, "image generating processing error" 2032 is displayed. In the print job field 2040, as the print job 4, "image generating processing" 2042 is displayed. In the print job field 2050, as the print job 5, "image generating processing error" 2052 is displayed. The time flow (from the present to the future) is represented from the left to the right.

In the print jobs 1 through 5, "image generating processing error" 2032 and "image generating processing error" 2052 are errors. Situations that are not possible to handle are described as an error (indicated by the dotted lines in FIG. 20).

If a check box at the head of a print job field is checked, image generating processing for this print job is started upon detecting that the "start image generating processing" button 2090 is pressed. In the example in FIG. 20, the check boxes of the print job fields 2030 and 2050 concerning the print jobs 3 and 5 in which an error will occur are not checked as a default. The check boxes of the other print job fields 2010, 2020, and 2040 are checked as a default.

Presenting an image generating processing schedule, such as that shown in FIG. 20, enables a user to recognize for which print job an image will not be generated, and is thus able to take certain measures. For example, the user does not select such a print job or causes another printer device 130 to perform printing.

A description will be given, with reference to FIGS. 21 through 23, an example of processing to be executed when a print job (image generating processing) in which an error will occur is transferred to another printer device (external controller).

Figure 21:
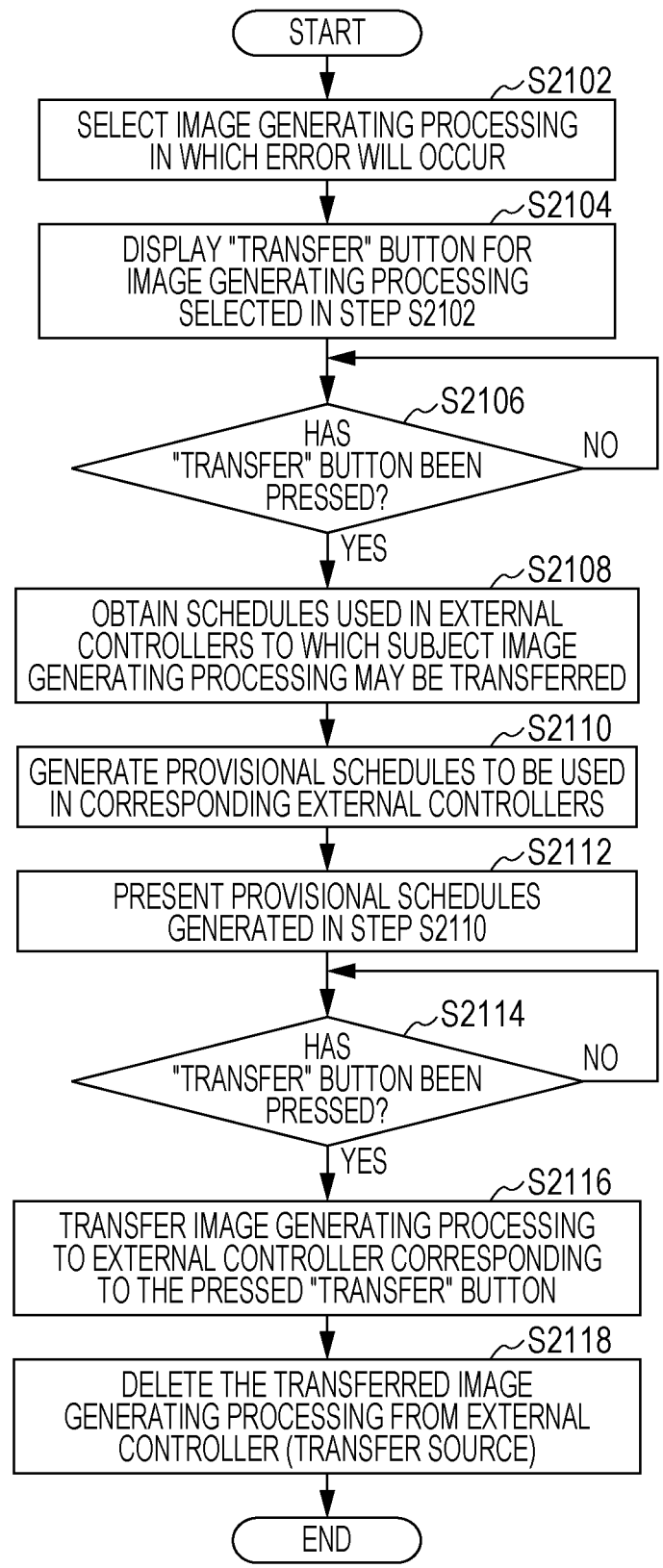
FIG. 21 is a flowchart illustrating an example of processing executed in the second exemplary embodiment.

FIG. 21 is a flowchart illustrating an example of processing executed in the second exemplary embodiment.

In step S2102, the image generating processing transfer module 1645 selects image generating processing in which an error will occur. If processing in the example of FIG. 17 is executed, the image generating processing transfer module 1645 selects the result of processing of FIG. 17. The image generating processing transfer module 1645 may alternatively execute step S1706 in FIG. 17.

In step S2104, the presenting module 1655 displays a "transfer" button for the image generating processing selected in step S2102.

Figure 22:
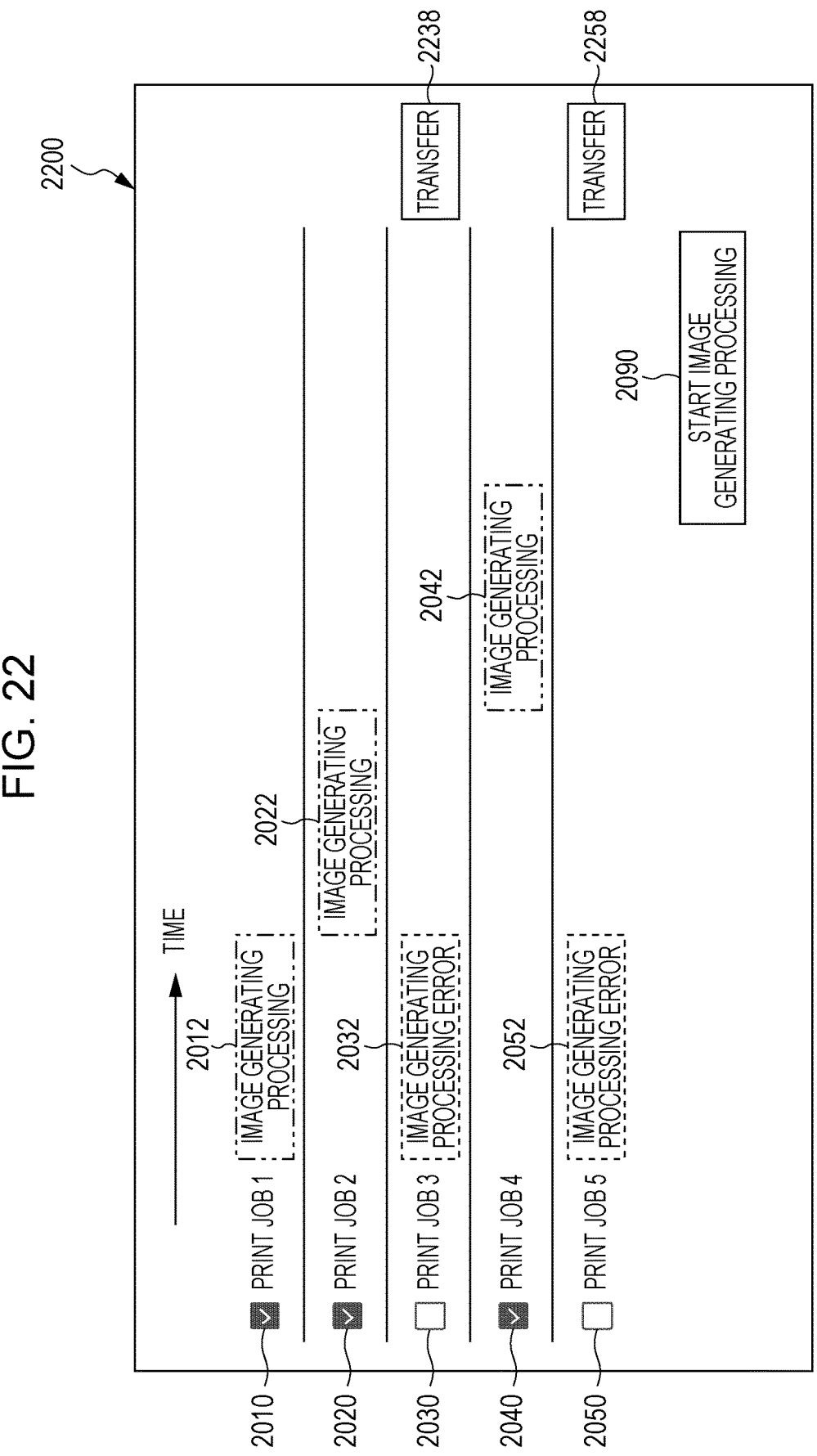
FIG. 22 illustrates a presentation example according to the second exemplary embodiment.

The presenting model 1655 presents "transfer" buttons, such as those on a screen 2200 in FIG. 22, for example. FIG. 22 illustrates a presentation example according to the second exemplary embodiment. The screen 2200 is a screen in which "transfer" buttons 2238 and 2258 are added to the screen 2000 shown in FIG. 20.

More specifically, the "transfer" button 2238 is added to the print job 3 in which "image generating processing error" 2032 will occur, and the "transfer" button 2258 is added to the print job 5 in which "image generating processing error" 2052 will occur.

In step S2106, the image generating processing transfer module 1645 judges whether a "transfer" button has been pressed. If a "transfer" button has been pressed, the process proceeds to step S2108. If no "transfer" button has been pressed, the image generating processing transfer module 1645 waits until a "transfer" button is pressed. By pressing a "transfer" button, the user is able to select a printer device (external controller) to which a print job (image generating processing) will be transferred as a result of executing steps S2106 through S2114.

In step S2108, the image generating processing transfer module 1645 obtains schedules used in external controllers to which the selected image generating processing may be transferred.

In step S2110, the transfer destination schedule generating module 1650 generates provisional schedules to be used in the corresponding individual external controllers.

In step S2112, the presenting module 1655 presents the provisional schedules generated in step S2110.

Figure 23:
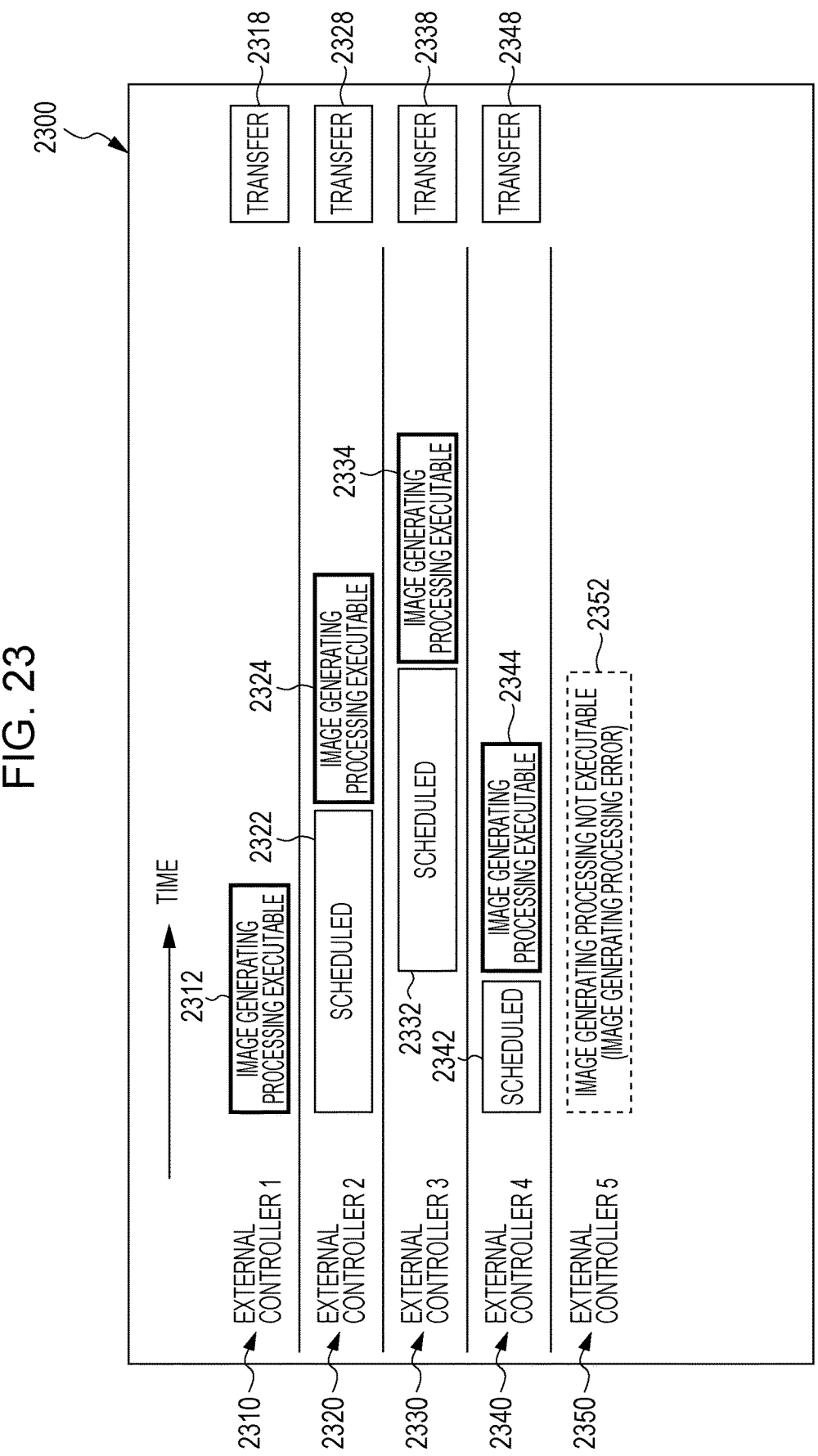
FIG. 23 illustrates a presentation example according to the second exemplary embodiment.

The presenting module 1655 presents the provisional schedules, such as those on a screen 2300 in FIG. 23, for example. FIG. 23 illustrates a presentation example according to the second exemplary embodiment. The screen 2300 is an external controller selection screen which displays during which time period a selected print job (image generating processing) can be executed. On the screen 2300, external controller fields 2310, 2320, 2330, 2340, and 2350 and "transfer" buttons 2318, 2328, 2338, and 2348 are displayed. In the external controller field 2310, "image generating processing executable" 2312 and the "transfer" button 2318 are displayed. In the external controller field 2320, "scheduled" 2322, "image generating processing executable" 2324, and the "transfer" button 2328 are displayed. In the external controller field 2330, "scheduled" 2332, "image generating processing executable" 2334, and the "transfer" button 2338 are displayed. In the external controller field 2340, "scheduled" 2342, "image generating processing executable" 2344, and the "transfer" button 2348 are displayed. In the external controller field 2350, "image generating processing not executable" (image generating processing error) 2352 is displayed.

That is, as candidates of the transfer destinations, five external controllers (external controller 1, external controller 2, external controller 3, external controller 4, and external controller 5) are available.

The screen 2300 shows the provisional schedules in the corresponding external controllers 1 through 5. If an external controller is not executing any image generating processing and no schedule is made for this external controller and if this external controller is able to execute image generating processing for the subject print job, an external controller field for this external controller is displayed, as in the external controller field 2310. If a schedule is made for an external controller and if this external controller is able to execute image generating processing for the subject print job, an external controller field is displayed, as in the external controller fields 2320, 2330, and 2340.

A "transfer" button is not displayed in the external controller field 2350. The reason for this is that the external controller 5 is unable to execute image generating processing even if the subject print job is transferred to the external controller 5.

In step S2114, the image generating processing transfer module 1645 judges whether a "transfer" button has been pressed. If a "transfer" button has been pressed, the process proceeds to step S2116. If no "transfer" button has been pressed, the image generating processing transfer module 1645 waits until a "transfer" button is pressed. Examples of a "transfer button" are the "transfer" buttons 2318, 2328, 2338, and 2348 shown in FIG. 23.

In step S2116, the image generating processing transfer module 1645 transfers the subject image generating processing to the external controller for which the "transfer" button has been pressed.

In step S2118, the image generating processing transfer module 1645 deletes the transferred image generating processing from the external controller (transfer source) and also from the schedule.

Processing for transferring a print job (image generating processing) which may be executed more efficiently by using another external controller to this external controller will be described below with reference to FIGS. 24 and 25.

Figure 24:
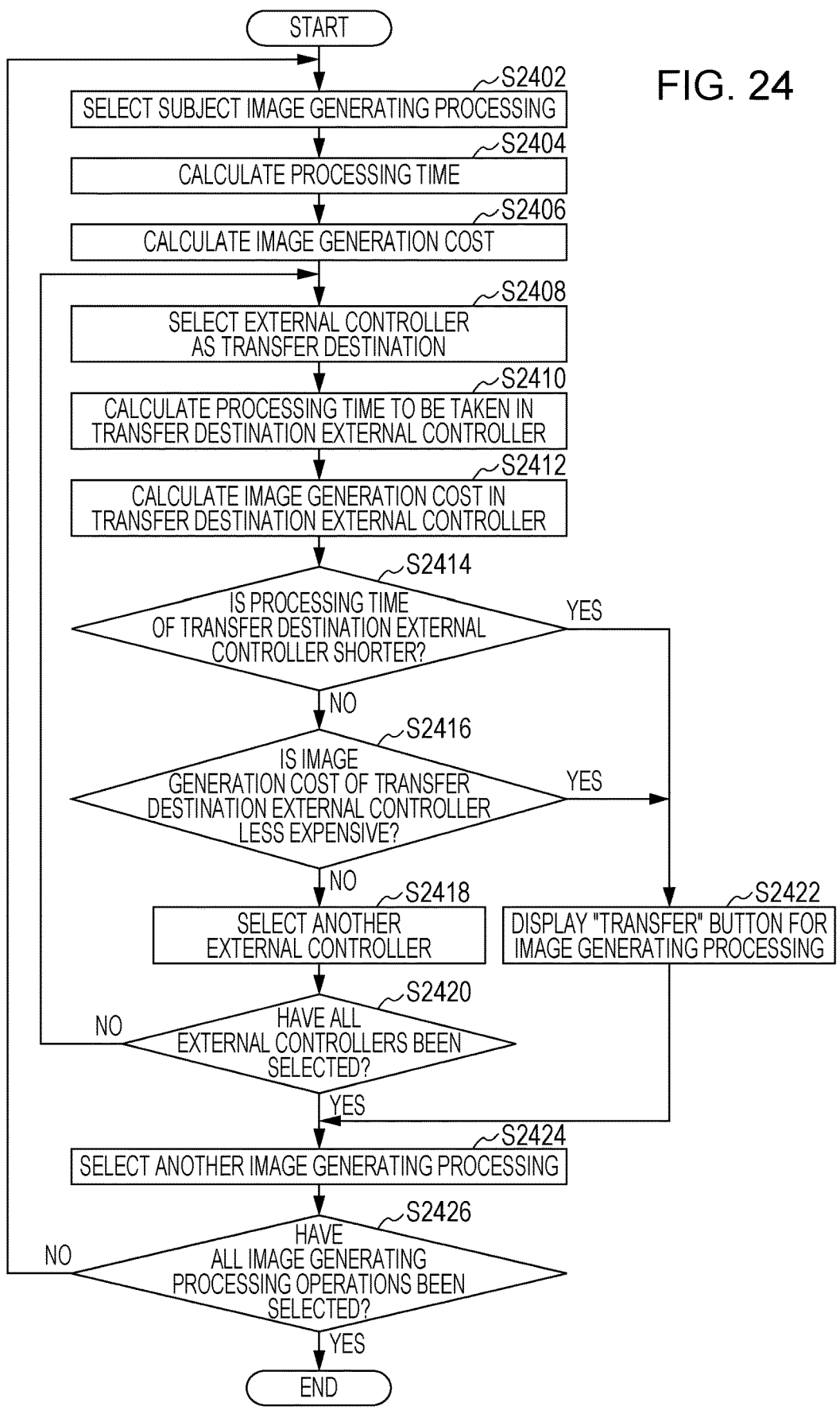
FIG. 24 is a flowchart illustrating an example of processing executed in the second exemplary embodiment.

FIG. 24 is a flowchart illustrating an example of processing executed in the second exemplary embodiment.

In step S2402, subject image generating processing is selected. For example, one of image generating processing operations of print jobs included in the schedule may be selected according to the processing order. One of image generating processing operations in which an error will occur may be selected.

In step S2404, the processing time is calculated. For example, as discussed above, the processing time is calculated by the number of pages of a document (the number-of-pages field 1820 of the document data table 1800) and by the processing speed of the external controller 100 (the processing speed field 1920 of the image processing performance table 1900). The processing end time of the subject image generating processing on the schedule may be calculated. It is assumed, for example, that one external controller 100 is scheduled to finish printing at 10:00, while the other external controller 100 at 8:00 because the other external controller 100 has less image generating processing operations to process. In this case, the other external controller 100 is more likely to be selected even if the processing speed of the other external controller 100 is slower.

In step S2406, the image generation cost of the image generating processing is calculated. The image generation cost may be calculated by the unit price (processing cost (processing cost field 1925 in the image processing performance table 1900)) and the number of pages of the document.

In step S2408, an external controller to which the subject image generating processing will be transferred is selected.

In step S2410, the processing time to be taken in the external controller selected as the transfer destination is calculated. The processing time to be taken if the subject image generating processing is executed in the transfer destination external controller is calculated in a manner similar to step S2404.

In step S2412, the image generation cost in the transfer destination external controller is calculated. The image generation cost to be incurred if the subject image generating processing is executed in the transfer destination external controller is calculated in a manner similar to step S2406.

In step S2414, it is judged whether the processing time of the transfer destination external controller is shorter than that of the transfer source external controller. If the processing time of the transfer destination external controller is shorter, the process proceeds to step S2422. If the processing time of the transfer destination external controller is not shorter, the process proceeds to step S2416.

In step S2416, it is judged whether the image generation cost of the transfer destination external controller is less expensive than that of the transfer source external controller. If the image generation cost of the transfer destination external controller is less expensive, the process proceeds to step S2422. If the image generation cost of the transfer destination external controller is not less expensive, the process proceeds to step S2418.

In step S2418, another external controller is selected.

In step S2420, it is judged whether all the external controllers have been selected. If all the external controllers have been selected, the process proceeds to step S2424. If not all the external controllers have been selected, the process returns to step S2408.

In step S2422, a "transfer" button for the subject image generating processing is displayed. In this case, the "transfer" button is displayed in a different mode from that displayed in step S2104 of FIG. 21. For example, the "transfer" button for the subject image generating processing may be indicated by the dotted lines, as shown in FIG. 25.

In step S2424, another image generating processing is selected.

In step S2426, it is judged whether all the image generating processing operations have been selected. If all the image generating processing operations have been selected, the processing is completed. If not all the image generating processing operations have been selected, the process returns to step S2402.

Thereafter, operations similar to steps S2106 through S2118 in the example in FIG. 21 are executed.

Figure 25:
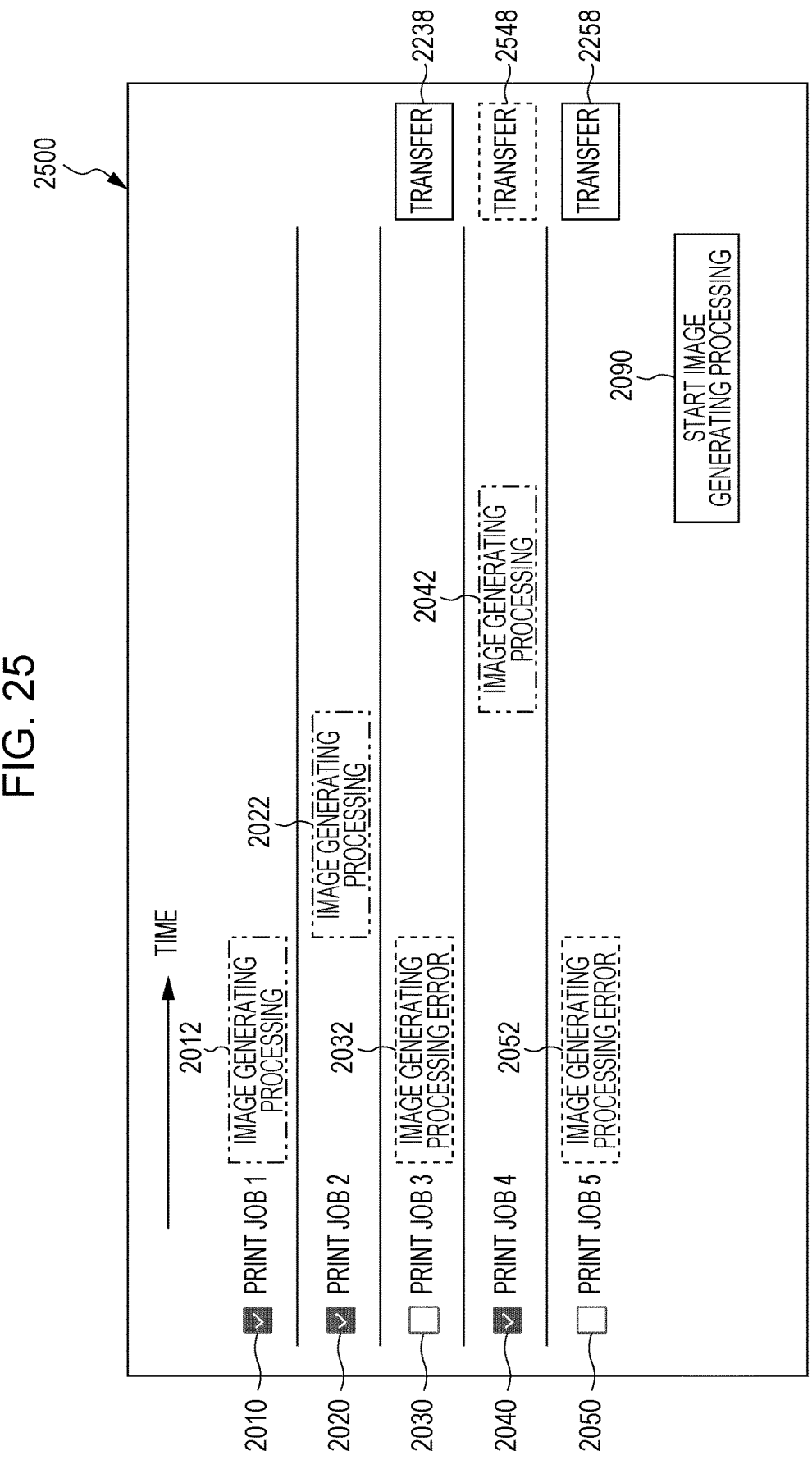
FIG. 25 illustrates a presentation example according to the second exemplary embodiment.

As a result of executing the processing in FIG. 24, a screen 2500 shown in FIG. 25, for example, is presented.

FIG. 25 illustrates a presentation example according to the second exemplary embodiment. The screen 2500 is a screen in which another "transfer" button is added to the screen 2200 shown in FIG. 22.

More specifically, a "transfer" button 2548 is added to the print job 4 in the print job field 2040. That is, the print job 4 is a job that will be executed more efficiently by using another external controller 100. The display mode of the "transfer" button 2548 is different from that of the "transfer" buttons 2238 and 2258 so as to distinguish a transfer operation for enhancing the processing efficiency from a transfer operation for preventing the occurrence of an error.

Figure 26:
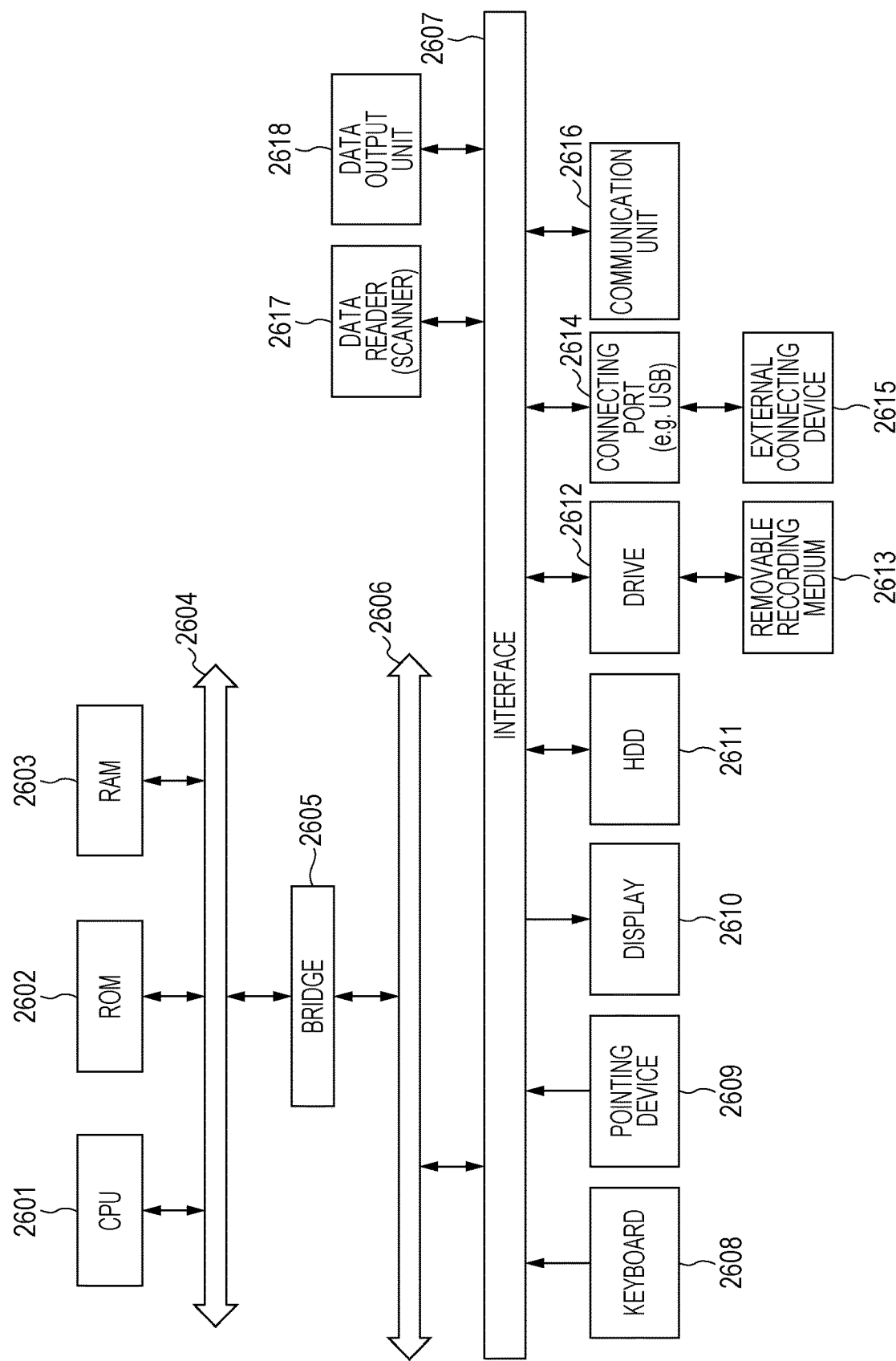
FIG. 26 is a block diagram illustrating an example of the hardware configuration of a computer implementing the exemplary embodiments.

An example of the hardware configuration of the external controller 100 of the exemplary embodiments will be described below with reference to FIG. 26. The hardware configuration shown in FIG. 26 is implemented as a personal computer (PC), for example, and includes a data reader 2617, such as a scanner, and a data output unit 2618, such as a printer.

A CPU 2601 is a control unit that executes processing in accordance with a computer program describing an execution sequence of the modules of the above-described exemplary embodiments, that is, the controller control module 110, the network control module 120, the print job receiving module 205, the print job selecting module 215, the schedule generating module 220, the schedule processing module 225, the error-occurrence judging module 230, the intervention-occurrence judging module 235, the schedule regenerating module 240, the print job transfer module 245, the transfer destination schedule generating module 250, the presenting module 255, the schedule generating module 1620, the schedule processing module 1625, the error-occurrence judging module 1630, the image generating processing transfer module 1645, the transfer destination schedule generating module 1650, and the presenting module 1655.

A read only memory (ROM) 2602 stores programs and operation parameters used by the CPU 2601. A RAM 2603 stores programs to be used during the execution of the CPU 2601 and parameters which change appropriately during the execution of the programs. The CPU 2601, the ROM 2602, and the RAM 2603 are connected to one another via a host bus 2604, which is constituted by, for example, a CPU bus.

The host bus 2604 is connected to an external bus 2606, such as a peripheral component interconnect/interface (PCI) bus, via a bridge 2605.

A keyboard 2608 and a pointing device 2609, such as a mouse, are devices operated by an operator. A display 2610 is a liquid crystal display or a cathode ray tube (CRT), for example, and displays various items of information as text or image information. Alternatively, a touchscreen having both of the functions of the pointing device 2609 and the display 2610 may be provided. In this case, to implement the function of a keyboard, unlike the keyboard 2608, the keyboard may not necessarily be a physical keyboard, and a keyboard drawn on a screen (touchscreen) by using software, that is, a so-called software keyboard or screen keyboard, may be used.

A hard disk drive (HDD) 2611 has a built-in hard disk (may alternatively be a flash memory, for example) and drives the hard disk so as to record or play back information or programs executed by the CPU 2601. The hard disk implements the function of the print job storage module 210, for example. Various other items of data and various other computer programs are also stored in the hard disk.

A drive 2612 reads data or a program recorded in a removable recording medium 2613, such as a magnetic disk, an optical disc, a magneto-optical disk, or a semiconductor memory, and supplies the read data or program to the RAM 2603 via an interface 2607, the external bus 2606, the bridge 2605, and the host bus 2604. The removable recording medium 2613 is also usable as a data recording region.

A connecting port 2614 is a port for connecting the PC to an external connecting device 2615, and has a connecting portion, such as a universal serial bus (USB) port or an IEEE1394 port. The connecting port 2614 is connected to, for example, the CPU 2601, via the interface 2607, the external bus 2606, the bridge 2605, and the host bus 2604. A communication unit 2616 is connected to a communication line and executes data communication processing with an external source. The data reader 2617 is a scanner, for example, and executes processing for reading documents. The data output unit 2618 is a printer (printer device 130), for example, and executes processing for outputting document data.

The hardware configuration of the external controller 110 shown in FIG. 26 is only an example, and the external controller 110 may be configured in any manner in which the modules described in the exemplary embodiments are executable. For example, some modules may be configured as dedicated hardware (for example, an application specific integrated circuit (ASIC)), or some modules may be installed in an external system and be connected to the external controller 100 via a communication line. Alternatively, a system, such as that shown in FIG. 26, may be connected to a system, such as that shown in FIG. 26, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, or a multifunction device (image processing apparatus including two or more functions among a scanner, a printer, a copying machine, and a fax machine).

The above-described program may be stored in a recording medium and be provided. The program recorded on a recording medium may be provided via a communication medium. In this case, the above-described program may be implemented as "a non-transitory computer readable medium storing the program" in the exemplary embodiments of the invention.

"A non-transitory computer readable medium storing a program" is a recording medium storing a program that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW, such as DVD+R and DVD+RW, compact discs (CDs), and more specifically, a read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EE-PROM) (registered trademark), a flash memory, a RAM, and a secure digital (SD) memory card.

The entirety or part of the above-described program may be recorded on such a recording medium and stored or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. Further, the program may be recorded in any form, for example, it may be compressed or encrypted in a manner such that it can be reconstructed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a generator that generates a schedule of a plurality of print jobs to be processed in a subject printer device,
   wherein the schedule indicates the order of processing of the print jobs;

an error-occurrence prediction module that predicts, for each of the print jobs for which scheduling has been made by the generator, whether an error will occur when a corresponding print job is executed by the printer device;

an intervention-occurrence prediction module that predicts, for each of the print jobs for which scheduling has been made by the generator, whether a user intervention will occur when a corresponding print job is executed by the printer device; and a presenter that presents, concerning the print job in which the error-occurrence prediction module predicted an error will occur, or the print job in which the intervention-occurrence prediction module predicted a user intervention will occur, the print job in a different mode from another print job by using the schedule.

2. The information processing apparatus according to claim 1, further comprising:
a regenerator that regenerates a schedule of the plurality of print jobs including a print job in which an error or a user intervention will occur so that no user intervention will occur or a time for which the subject printer device is unavailable will be decreased.

3. The information processing apparatus according to claim 2, wherein the regenerator regenerates a schedule so that a function to be used in a first print job will be different from a function to be used in a second print job, the second print job being executed subsequent to the first print job.

4. The information processing apparatus according to claim 3, wherein the regenerator regenerates a schedule by applying at least one of rules:
(1) a rule that a printed-material output location to be used in the first print job is different from a printed-material output location to be used in the second print job;
(2) a rule that a recording-medium feeder to be used in the first print job is different from a recording-medium feeder to be used in the second print job; and
(3) a rule that a toner type to be used in the first print job is different from a toner type to be used in the second print job.

5. The information processing apparatus according to claim 1, wherein the presenter provides a first presentation that makes it possible to receive a first instruction to transfer a print job in which an error or a user intervention will occur to a different printer device.

6. The information processing apparatus according to claim 5, wherein the presenter provides a different presentation that makes it possible to receive a second instruction to transfer a print job which will be executed more efficiently by using a different printer device than by using the subject printer device to the different printer device, the different presentation being provided in a different mode from the first presentation.

7. The information processing apparatus according to claim 6, wherein, upon receiving the first instruction or the second instruction, the presenter presents a schedule to be used in the different printer device before the print job corresponding to the first instruction or the second instruction is transferred to the different printer device.

8. An information processing apparatus comprising:
a generator that generates a schedule of processing for generating images of a plurality of print jobs to be printed by a subject printer device,
wherein the schedule indicates the order of processing of the print jobs;
an error-occurrence prediction module that predicts, for each of the print jobs for which scheduling has been made by the generator, whether an error will occur when a corresponding print job is executed by the printer device; and
a presenter that presents, concerning the print job in which the error-occurrence prediction module predicted an error will occur, the print job in a different mode from another print job by using the schedule.

9. The information processing apparatus according to claim 8, wherein the presenter provides a first presentation that makes it possible to receive a first instruction to transfer a print job in which an error will occur to a different printer device.

10. The information processing apparatus according to claim 9, wherein the presenter provides a different presentation that makes it possible to receive a second instruction to transfer a print job which will be executed more efficiently by using a different printer device than by using the subject printer device to the different printer device, the different presentation being provided in a different mode from the first presentation.

11. The information processing apparatus according to claim 10, wherein, upon receiving the first instruction or the second instruction, the presenter presents a schedule to be used in the different printer device before the print job corresponding to the first instruction or the second instruction is transferred to the different printer device.

12. A non-transitory computer readable medium storing a program causing a computer to execute a process, the process comprising:
generating a schedule of a plurality of print jobs to be processed in a subject printer device,
wherein the schedule indicates the order of processing of the print jobs;
predicting, for each of the print jobs for which scheduling has been made, whether an error will occur when a corresponding print job is executed by the printer device;
predicting, for each of the print jobs for which scheduling has been made, whether a user intervention will occur when a corresponding print job is executed by the printer device; and
presenting, concerning the print job in which a prediction has been made that an error will occur, or the print job in which a prediction has been made that a user intervention will occur, the print job in a different mode from another print job by using the schedule.

* * * * *